(12) United States Patent
Ozawa

(10) Patent No.: US 10,141,586 B2
(45) Date of Patent: Nov. 27, 2018

(54) FUEL CELL MODULE, COMBINED POWER GENERATION SYSTEM INCLUDING THE SAME, AND TEMPERATURE CONTROL METHOD OF FUEL CELL POWER GENERATION SECTION

(71) Applicant: MITSUBISHI HITACHI POWER SYSTEMS, LTD., Kanagawa (JP)

(72) Inventor: Hiroyuki Ozawa, Kanagawa (JP)

(73) Assignee: MITSUBISHI HITACHI POWER SYSTEMS, LTD., Kanagawa (JP)

(*) Notice: Subject to any disclaimer, the term of this patent is extended or adjusted under 35 U.S.C. 154(b) by 141 days.

(21) Appl. No.: 14/935,681

(22) Filed: Nov. 9, 2015

(65) Prior Publication Data

US 2016/0133955 A1 May 12, 2016

(30) Foreign Application Priority Data

Nov. 11, 2014 (JP) .................................. 2014-228933

(51) Int. Cl.
| | | |
|---|---|---|
| *H01M 8/04* | (2016.01) | |
| *H01M 8/04014* | (2016.01) | |
| *H01M 8/2475* | (2016.01) | |
| *H01M 8/249* | (2016.01) | |
| *H01M 8/0432* | (2016.01) | |
| *H01M 8/04746* | (2016.01) | |
| *H01M 8/124* | (2016.01) | |

(52) U.S. Cl.
CPC ..... *H01M 8/04014* (2013.01); *H01M 8/0432* (2013.01); *H01M 8/04776* (2013.01);
(Continued)

(58) Field of Classification Search
CPC ......... H01M 8/04007; H01M 8/04014; H01M 8/2475; H01M 8/04089; H01M 8/04111;
(Continued)

(56) References Cited

U.S. PATENT DOCUMENTS 5,190,099 A † 3/1993 Mon
6,611,428 B1 † 8/2003 Wang
(Continued)

FOREIGN PATENT DOCUMENTS

JP 1-320773 12/1989
JP 2-256169 10/1990
(Continued)

OTHER PUBLICATIONS

Office Action dated Jun. 26, 2018 in Japanese Application No. 2014-228933, with English translation.

*Primary Examiner* — Raymond Alejandro
(74) *Attorney, Agent, or Firm* — Wenderoth, Lind & Ponack, L.L.P.

(57) ABSTRACT

A fuel cell includes a cell side insulation (2) separating an internal space of a pressure vessel (205) into an outer space (5) and an inner space (6), a plurality of cell stacks (101) disposed in the inner space, and a lower damper (11-*i*). In the cell side insulation, a plurality of lower flow passages (7) which connect a lower portion of the outer space to a lower portion of the inner space and a plurality of upper flow passages (8) which connect an upper portion of the outer space to an upper portion of the inner space are formed. The lower damper adjusts a flow rate of a gas that flows toward the inner space from the outer space via the plurality of lower flow passages and flows toward the outer space from the inner space via the plurality of upper flow passages.

9 Claims, 9 Drawing Sheets

(52) U.S. Cl.
CPC ......... *H01M 8/249* (2013.01); *H01M 8/2475* (2013.01); *H01M 2008/1293* (2013.01)

(58) Field of Classification Search
CPC ........... H01M 8/0432; H01M 8/04425; H01M 8/04776; H01M 8/249; H01M 2008/1293
See application file for complete search history.

(56) References Cited

U.S. PATENT DOCUMENTS

| | | | |
|---|---|---|---|
| 2003/0197295 | A1 | 10/2003 | Nakai et al. |
| 2005/0237716 | A1* | 10/2005 | Chu .................. H05K 7/20736 361/696 |
| 2007/0026274 | A1 | 2/2007 | Akita et al. |
| 2008/0063907 | A1 | 3/2008 | Takahashi et al. |
| 2009/0246566 | A1* | 10/2009 | Craft, Jr. ........... H01M 8/04007 429/413 |

FOREIGN PATENT DOCUMENTS

| | | |
|---|---|---|
| JP | 2003-290987 | 10/2003 |
| JP | 2007-35489 | 2/2007 |
| JP | 2008-293779 | 12/2008 |
| JP | 2014-164809 | 9/2014 |
| JP | 2014-164903 | 9/2014 |

\* cited by examiner
† cited by third party

FUEL CELL MODULE, COMBINED POWER GENERATION SYSTEM INCLUDING THE SAME, AND TEMPERATURE CONTROL METHOD OF FUEL CELL POWER GENERATION SECTION

TECHNICAL FIELD

The present invention relates to a fuel cell module, a combined power generation system including the same, and a temperature control method of a fuel cell power generation section.

BACKGROUND ART

Fuel cells which generate power through a chemical reaction between a fuel gas and an oxidizing gas are known. Among the fuel cells, a solid oxide fuel cell (SOFC) is a fuel cell which uses ceramics such as zirconia ceramics as an electrolyte and is operated using town gas, natural gas, petroleum, methanol, coal gasification gas, or the like as a fuel. Such an SOFC is known as a high-temperature fuel cell which has a high operating temperature of about 700° C. to 1000° C. in order to increase the ionic conductivity and has a high efficiency in wide applications (refer to Patent Documents 1 and 2). The SOFC is, for example, combined with an internal combustion engine such as a micro gas turbine (hereinafter, called an MGT) to form a combined power generation system, in which compressed air discharged from a compressor is supplied to an air electrode (cathode) of the SOFC, exhaust fuel gas of high temperature discharged from the SOFC is supplied to a combustor of the MGT via a blower to be combusted, and the turbine is rotated by combustion gas generated by the combustor, thereby achieving power generation with high power generation efficiency.

RELATED ART DOCUMENT

Patent Document

[Patent Document 1] JP-A-1-320773
[Patent Document 2] JP-A-2014-164903

SUMMARY OF THE INVENTION

Problem that the Invention is to Solve

From the viewpoint of performance and durability, the temperature of a power generation section in the fuel cell module during the power generation of the SOFC is preferably controlled to an optimal temperature range of generally about 700° C. to 1000° C. depending on the operating conditions and use material of the SOFC. In addition, since the SOFC generates heat while generating power, the SOFC is generally cooled by gas (the air as an oxidizing agent or a fuel gas) that passes through the inside of the fuel cell module to be maintained at a predetermined temperature. Therefore, in order to adjust a cooling amount for the adjustment of the temperature of the power generation section of the SOFC, the flow rate of the gas that passes through the inside of the fuel cell module or the temperature of the gas is adjusted.

In a case of cooling the SOFC by controlling the flow rate of the air as the oxidizing agent and the fuel, for example, the amount of the air which is the amount that can be supplied is limited by the capacity of the gas turbine operated in combination with the SOFC. However, by controlling the flow rate of the fuel and the air that are re-circulated and the amount of heat exchanged therebetween, the temperature of the power generation section of the SOFC can be adjusted. However, the power consumption and capacity of a blower is necessary to be increased.

In a case of cooling the SOFC by controlling the temperature of the air supplied to the fuel cell module, for example, the lower limit of the temperature of the air supplied from the outlet of the compressor of the gas turbine is determined by the specification (pressure ratio) of the gas turbine (for example, the temperature of the air at the outlet of the compressor of the gas turbine is limited depending on the pressure ratio of the gas turbine). Therefore, in order to widely adjust the temperature of the air supplied to the fuel cell module, there is a problem that a large-size heat exchanger having a sufficient heat transfer area is needed.

In addition, it may be considered that the heat generation itself by the SOFC is cooled through heat recovery by a refrigerant such as steam, hot water, or the like. However, when a heat recovery unit is installed in the vicinity of electrical conduction parts, there is a possibility that new problems such as electric leakage caused by contact between the heat recovery unit and the electrical conduction parts, burnout of the heat exchange part during the stop of the refrigerant, and damage to cell stacks during the leakage of the refrigerant may occur.

Furthermore, when variations of the power generation performance occur between the cell stacks due to the variation of operating temperature thereof and if the temperature distribution of the cell stacks significantly varies, there is a problem that the overall power generation performance of the fuel cell module is reduced.

The present invention has been made the foregoing circumstances into consideration, and the object thereof is to provide a fuel cell module provided with temperature adjustment means for appropriately controlling the temperatures of cell stacks without causing serious problems such as damage to the cell stacks at low cost, a combined power generation system using the same, and a temperature control method of a fuel cell power generation section.

Means for Solving the Problem

In order to solve the problems, a fuel cell module of the present invention, a combined power generation system including the same, and a temperature control method of a fuel cell power generation section employ the following means.

A fuel cell module according to the present invention includes: a pressure vessel which forms an internal space in which a gas is present; an insulation board which partitions the internal space into an outer space and an inner space; a plurality of cell stacks disposed in the inner space; and a convection flow rate adjusting device. A lower flow passage which connects a lower portion of the outer space on a side vertically lower than the plurality of cell stacks to a lower portion of the inner space on a side vertically lower than the plurality of cell stacks, and an upper flow passage which connects an upper portion of the outer space on a side vertically higher than the plurality of cell stacks to an upper portion of the inner space on a side vertically higher than the plurality of cell stacks are formed in the insulation board, and the convection flow rate adjusting device adjusts a flow rate of at least a part of the gas that flows toward the inner space from the outer space via the lower flow passage and flows toward the outer space from the inner space via the upper flow passage.

In the fuel cell module, the temperatures of the plurality of cell stacks can be controlled by adjusting the flow rate of the gas that flows between the outer space and the inner space which are separated by the insulation board that surrounds the plurality of cell stacks.

When a temperature of the plurality of cell stacks becomes a higher temperature or a lower temperature than a predetermined temperature range, the convection flow rate adjusting device adjusts the flow rate of at least a part of the gas that flows toward the inner space from the outer space via the lower flow passage and flows toward the outer space from the inner space via the upper flow passage.

In the fuel cell module, the temperatures of the plurality of cell stacks can be controlled to allow the temperatures of the plurality of cell stacks to be included in the predetermined temperature range by adjusting the flow rate of the gas that flows between the outer space and the inner space according to the temperatures of the plurality of cell stacks.

The convection flow rate adjusting device includes a lower damper which adjusts the flow rate of the gas that passes through the lower flow passage.

In the fuel cell module, the flow rate of the gas that flows between the outer space and the inner space can be adjusted by adjusting the flow rate of the gas that passes through the lower flow passage formed in a lower portion of the insulation board that surrounds the plurality of cell stacks, thereby controlling the temperatures of the plurality of cell stacks.

The lower flow passage includes a plurality of lower flow passages which are respectively disposed at a plurality of different positions, and the lower damper separately adjusts the flow rates of the gases which respectively pass through the plurality of lower flow passages.

In the fuel cell module, the temperatures of the plurality of cell stacks can be appropriately controlled to reduce the temperature distribution of the plurality of cell stacks by controlling the temperatures of the plurality of cell stacks that are disposed at the plurality of different positions using the gases having different flow rates.

The lower damper includes a member which is elastically deformed to come into close contact with an opening of the lower flow passage on a side of the outer space in case where the lower flow passage is closed.

In the fuel cell module, sealability with which the lower flow passage is closed can be enhanced, and thus the flow rate of the gas that flows between the outer space and the inner space can be adjusted with high accuracy.

The convection flow rate adjusting device further includes an upper damper which adjusts the flow rate of the gas that passes through the upper flow passage.

In the fuel cell module, by further adjusting the flow rate of the gas that passes through the upper flow passage formed in an upper portion of the insulation board that surrounds the plurality of cell stacks, the flow rate of the gas that flows between the outer space and the inner space can be adjusted with high accuracy, thereby appropriately controlling the temperatures of the plurality of cell stacks.

The upper damper includes a member which is elastically deformed to come into close contact with an opening of the upper flow passage on the side of the outer space in case where the upper flow passage is closed.

In the fuel cell module, sealability with which the upper flow passage is closed can be enhanced, and thus the flow rate of the gas that flows between the outer space and the inner space can be adjusted with high accuracy.

A blade of the upper damper which opens and closes the upper flow passage has higher heat resistance than a blade of the lower damper which opens and closes the lower flow passage.

In the fuel cell module, compared to a fuel cell module in which the heat resistance of the blade of the upper damper is at the same degree as the heat resistance of the blade of the lower damper, the lower damper can use a material having low heat resistance due to a low ambient temperature and it causes that the lower damper and the upper damper can be manufactured at lower costs.

The upper damper includes an insulating member which covers the blade which opens and closes the upper flow passage.

In the fuel cell module, a temperature rise of the blade of the upper damper due to radiant heat from the plurality of cell stacks via the upper flow passage can be prevented, and thus burnout of the blade of the upper damper can be prevented.

The convection flow rate adjusting device further includes an intermediate damper which adjusts the flow rate of the gas that passes through an intermediate flow passage formed in the insulation board between the upper flow passage and the lower flow passage.

In the fuel cell module, by further adjusting the flow rate of the gas that passes through the intermediate flow passage formed at an intermediate position of the insulation board that surrounds the plurality of cell stacks, the vertical distribution of the flow rate of the gas that flows in the inner space can be further adjusted, thereby appropriately controlling the vertical temperature distribution of the cell stacks.

The lower flow passage, the upper flow passage, or the intermediate flow passage is bent so as not to allow radiant heat of the plurality of cell stacks to be directly emitted toward the outer space from the inner space.

In the fuel cell module, since the lower flow passage, the upper flow passage, or the intermediate flow passage is bent, radiant heat of the plurality of cell stacks transferred to the blade that opens and closes the lower flow passage, the upper flow passage, or the intermediate flow passage can be reduced, and thus burnout of the blade can be prevented.

The fuel cell module according to the present invention further includes a seal plate which covers a part of the insulation board in which the lower flow passage, the upper flow passage, and the intermediate flow passage are not formed.

In the fuel cell module, since the seal plate prevents the gas from flowing through the part of the insulation board in which the lower flow passage, the upper flow passage, and the intermediate flow passage are not formed, the flow rate of the gas that flows between the outer space and the inner space can be adjusted with high accuracy, thereby appropriately controlling the temperatures of the plurality of cell stacks.

The convection flow rate adjusting device includes a fan which supplies the gas to the inner space from the outer space via the lower flow passage.

In the fuel cell module, by forcibly supplying the air in the outer space to the inner space via the lower flow passage, the flow rate of the gas that flows between the outer space and the inner space can be adjusted with high accuracy, thereby appropriately controlling the temperatures of the plurality of cell stacks.

The fuel cell module according to the present invention further includes a cooling device which cools the gas that flows in the outer space.

In the fuel cell module, by further cooling the gas using the cooling device provided separately from the pressure vessel, the plurality of cell stacks can be effectively cooled, thereby appropriately controlling the temperatures of the plurality of cell stacks.

A combined power generation system according to the present invention includes: the fuel cell module according to the present invention; and a gas turbine which generates rotational power by using an exhaust fuel gas and an exhaust oxidizing gas discharged from the fuel cell module. An oxidizing gas compressed by using the rotational power is supplied to the fuel cell module as the gas supplied for SOFC, and the plurality of cell stacks generate power using a fuel gas and the oxidizing gas.

In the combined power generation system, since the fuel cell module according to the present invention appropriately controls the temperatures of the plurality of cell stacks, even when not a large amount of oxidizing gas is supplied to the fuel cell module, the fuel cell module can be sufficiently cooled. Therefore, the number of fuel cell modules installed per gas turbine can be increased. In addition, in the combined power generation system, since the fuel cell module according to the present invention appropriately controls the temperatures of the plurality of cell stacks, even when an exhaust air re-circulation blower for re-circulating exhaust air at a high temperature and a facility for cooling the oxidizing gas are not added, the fuel cell module can be sufficiently cooled, thereby reducing the manufacturing cost.

A temperature control method of a fuel cell power generation section according to the present invention is executed by using a fuel cell module. The fuel cell module includes: a pressure vessel which forms an internal space; an insulation board which partitions the internal space into an outer space and an inner space; a plurality of cell stacks disposed in the inner space; and temperature measurement means of the plurality of cell stacks. A lower flow passage which connects a lower portion of the outer space on a side vertically lower than the plurality of cell stacks to a lower portion of the inner space on a side vertically lower than the plurality of cell stacks, and an upper flow passage which connects an upper portion of the outer space on a side vertically higher than the plurality of cell stacks to an upper portion of the inner space on a side vertically higher than the plurality of cell stacks are formed in the insulation board. The temperature control method of a fuel cell power generation section according to the present invention includes a convection flow rate adjusting process of adjusting a flow rate of at least a part of gas that flows toward the inner space from the outer space via the lower flow passage and flows toward the outer space from the inner space via the upper flow passage is included.

According to the temperature control method of a fuel cell power generation section, the fuel cell module can adjust the flow rate of the gas that flows between the outer space and the inner space which are separated by the insulation board that surrounds the plurality of cell stacks, thereby controlling the temperatures of the plurality of cell stacks.

Advantage of the Invention

The fuel cell module, the combined power generation system including the same, and the temperature control method of a fuel cell power generation section according to the present invention can appropriately control the temperatures of the plurality of cell stacks by adjusting the flow rate of the gas that flows between the outer space and the inner space which are separated by the insulation board that surrounds the plurality of cell stacks.

BEST MODE FOR CARRYING OUT THE INVENTION

Hereinafter, fuel cell modules according to embodiments of the present invention will be described with reference to the drawings.

First Embodiment

Figure 1:
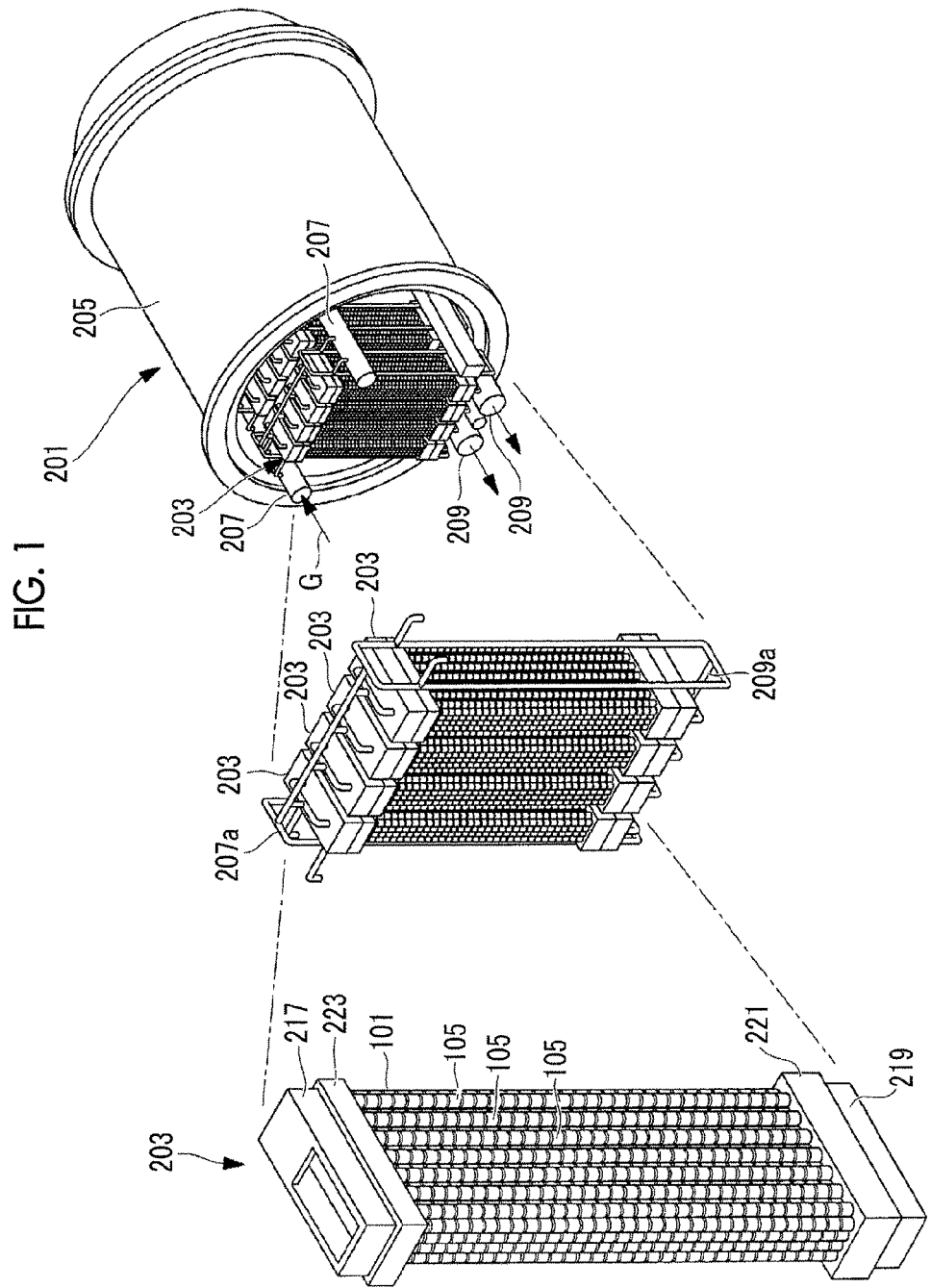
FIG. 1 is an exploded perspective view illustrating a fuel cell module.

A fuel cell module 201 of a first embodiment is provided in a fuel cell system, and as illustrated in FIG. 1, includes, for example, a plurality of SOFC cartridges 203 and a pressure vessel 205 which accommodates the plurality of SOFC cartridges 203. The fuel cell module 201 includes a fuel gas supply pipe 207 and a plurality of fuel gas supply branch pipes 207a. The fuel cell module 201 includes a fuel gas discharge pipe 209 and a plurality of fuel gas discharge branch pipes 209a. The fuel cell module 201 further includes an oxidizing gas supply pipe 211, oxidizing gas supply branch pipes 212, an oxidizing gas discharge pipe 213, and a plurality of oxidizing gas discharge branch pipes 214, which will be described later using FIGS. 4 and 5.

As the fuel gas, for example, hydrogen, carbon monoxide, a hydrocarbon-based gas such as methane, a gas produced by a gasification facility for a carbonaceous raw material such as coal, town gas, natural gas, or a gas mixture of a plurality of components thereof may be used. As the oxidizing gas, a gas containing approximately 15% to 30% of oxygen is normally used, and representatively, the air is appropriate. However, other than the air, a gas mixture of combustion exhaust gas and the air, a gas mixture of oxygen and the air, or the like may also be used.

The fuel cell system is provided with, to cope with the power generation output of fuel cell modules 201 (not illustrated) in addition to the fuel cell module 201, a fuel gas supply unit (not illustrated) which supplies the fuel gas having a predetermined gas composition and a predetermined flow rate and an oxidizing gas supply unit (not illustrated) outside the pressure vessel 205. The fuel gas supply pipe 207 is connected to the fuel gas supply unit and the plurality of fuel gas supply branch pipes 207a. The fuel gas supply pipe 207 allows the fuel gas supplied from the above-mentioned fuel gas supply unit at a predetermined flow rate to be branched off and guided to the plurality of fuel gas supply branch pipes 207a. In addition, the fuel gas supply branch pipes 207a are connected to the fuel gas supply pipe 207 and are connected to the plurality of SOFC cartridges 203. The plurality of fuel gas supply branch pipes 207a guide the fuel gas supplied from the fuel gas supply pipe 207 to the plurality of SOFC cartridges 203 at substantially equal flow rates to allow the power generation efficiency of the plurality of SOFC cartridges 203 to be substantially uniformized.

The fuel gas discharge branch pipes 209a are connected to the plurality of SOFC cartridges 203 and are connected to the fuel gas discharge pipe 209. The fuel gas discharge branch pipes 209a guide exhaust fuel gas discharged from the SOFC cartridges 203 to the fuel gas discharge pipe 209. The fuel gas discharge pipe 209 is connected to the plurality of fuel gas discharge branch pipes 209a, and a part of the fuel gas discharge pipe 209 is disposed outside the pressure vessel 205. The fuel gas discharge pipe 209 guides the exhaust fuel gas introduced from the fuel gas discharge branch pipes 209a at substantially equal flow rates to the outside of the pressure vessel 205.

The pressure vessel 205 is operated at an internal pressure of 0.2 MPa to about 2 MPa and an internal temperature of atmospheric temperature to about 550° C., and thus a material which has strength for the pressure parts thereof and has corrosion resistance to the oxidizing agent such as oxygen contained in the oxidizing gas is used as the material of the pressure vessel. It is general that a pressure vessel internal insulation 1 is constructed on the inner surface thereof to reduce the temperature of the pressure parts so that the pressure vessel 205 is used under conditions in which corrosiveness due to the oxidizing gas is reduced and the strength of the material is high. For example, if the insulation is not constructed on the inner surface of the pressure vessel, a stainless steel material such as SUS304 is necessary. However, when the insulation is used, carbon steel or high-strength steel can be used.

Figure 2:
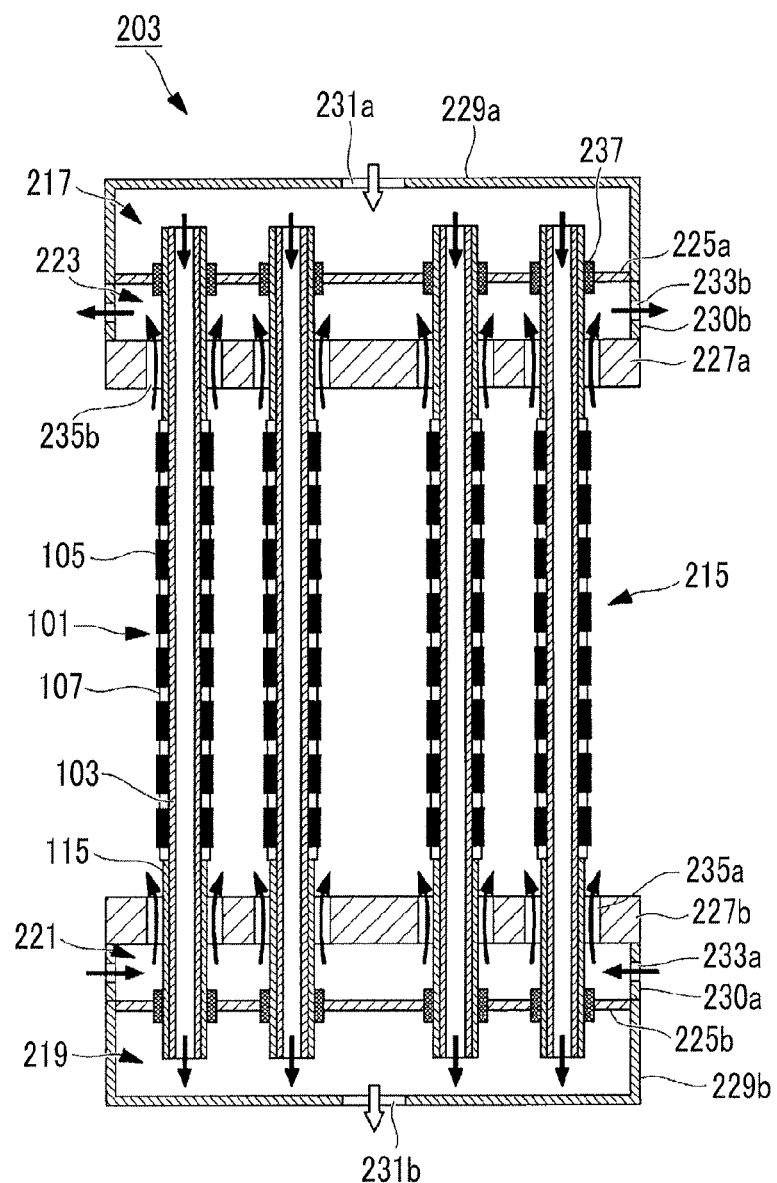
FIG. 2 is a sectional view illustrating a SOFC cartridge.

As illustrated in FIG. 2, the SOFC cartridge 203 includes a plurality of cell stacks 101 having a cylindrical shape, a power generation chamber 215, a fuel gas supply chamber 217, a fuel gas discharge chamber 219, an oxidizing gas supply chamber 221, and an oxidizing gas discharge chamber 223. In addition, the SOFC cartridge 203 includes an upper tube plate 225a, a lower tube plate 225b, an upper insulation 227a, and a lower insulation 227b. In this embodiment, the SOFC cartridge 203 has a structure in which the fuel gas supply chamber 217, the fuel gas discharge chamber 219, the oxidizing gas supply chamber 221, and the oxidizing gas discharge chamber 223 are arranged as illustrated in FIG. 2 and the fuel gas and the oxidizing gas respectively flow through the inside of the cylindrical tube and the outside thereof of the plurality of cell stacks 101 while opposing each other. However, the SOFC cartridge 203 does not necessarily have this structure, and for example, the fuel gas and the oxidizing gas may respectively flow through the inside of the cylindrical tube and the outside thereof of the plurality of cell stacks 101 while being parallel to each other, or the oxidizing gas may flow in a direction perpendicular to the axial direction of the plurality of cell stacks 101. When the upflow and downflow shown in FIG. 2 is the vertically upflow and downflow, the cell stacks may be rotated 90° from the state shown in FIG. 2 to be installed in a lateral direction (horizontal direction) so that the fuel gas flows in the axial direction of the cell stacks 101. In addition, FIG. 1 illustrates that the pressure vessel is installed in the lateral direction (horizontal direction). However, the pressure vessel may also be in the longitudinal direction (vertical direction).

The power generation chamber 215 is a region formed between the upper insulation 227a and the lower insulation 227b. The power generation chamber 215 is a region in which fuel cells 105 of the plurality of cell stacks 101 are arranged and the fuel gas and the oxidizing gas electrochemically react with each other to generate power. In addition, the temperature of the vicinity of the axially center portion of the plurality of cell stacks 101 of the power generation chamber 215 is in a high-temperature atmosphere of 700° C. to 1000° C. during a steady operation of the fuel cell module 201.

The fuel gas supply chamber 217 is a region surrounded by a fuel gas supply chamber casing 229a of the SOFC cartridge 203 and the upper tube plate 225a. In addition, the fuel gas supply chamber 217 communicates with the fuel gas supply branch pipe 207a through a fuel gas supply hole 231a formed in the fuel gas supply chamber casing 229a. In the fuel gas supply chamber 217, one terminal of each of the plurality of cell stacks 101 is disposed to be open to the fuel gas supply chamber 217. The fuel gas supply chamber 217 guides the fuel gas supplied from the fuel gas supply branch pipe 207a via the fuel gas supply hole 231a to the insides of the cylindrical tubes of the plurality of cell stacks 101 at substantially equal flow rates and thus allows the power generation efficiency of the plurality of cell stacks 101 to be substantially uniformized.

The fuel gas discharge chamber 219 is a region surrounded by a fuel gas discharge chamber casing 229b of the SOFC cartridge 203 and the lower tube plate 225b. In addition, the fuel gas discharge chamber 219 communicates with the fuel gas discharge branch pipe 209a through a fuel gas discharge hole 231b formed in the fuel gas discharge chamber casing 229b. In the fuel gas discharge chamber 219, one terminal of each of the plurality of cell stacks 101 is disposed to be open to the fuel gas discharge chamber 219. The fuel gas discharge chamber 219 collects the exhaust fuel gas that passes through the insides of the plurality of cell stacks 101 and is supplied to the fuel gas discharge chamber 219 and guides the exhaust fuel gas to the fuel gas discharge branch pipe 209a via the fuel gas discharge hole 231b.

The oxidizing gas supply pipe 211 receives the oxidizing gas (the air or the like) supplied from the above-mentioned oxidizing gas supply unit at a predetermined flow rate and allows the oxidizing gas having a predetermined gas composition and a predetermined flow rate to cope with the power generation output of the fuel cell module 201 to be branched off to the plurality of oxidizing gas supply branch pipes 212 and supplied to the plurality of SOFC cartridges 203. The oxidizing gas supply chamber 221 is a region surrounded by an oxidizing gas supply chamber casing 230a of the SOFC cartridge 203, the lower tube plate 225b, and the lower insulation 227b. In addition, the oxidizing gas supply chamber 221 communicates with the plurality of oxidizing gas supply branch pipes 212 via oxidizing gas supply holes 233a provided in the oxidizing gas supply chamber casing 230a. The oxidizing gas supply chamber 221 guides the oxidizing gas supplied from the plurality of oxidizing gas supply branch pipes 212 via the oxidizing gas supply holes 233a at a predetermined flow rate to the power generation chamber 215 via oxidizing gas supply gaps 235a.

The oxidizing gas discharge chamber 223 is a region surrounded by an oxidizing gas discharge chamber casing 230b of the SOFC cartridge 203, the upper tube plate 225a, and the upper insulation 227a. In addition, the oxidizing gas discharge chamber 223 communicates with the oxidizing gas discharge branch pipes 214, which will be described later, via oxidizing gas discharge holes 233b provided in the oxidizing gas discharge chamber casing 230b. The oxidizing gas discharge chamber 223 guides exhaust oxidizing gas supplied from the power generation chamber 215 to the oxidizing gas discharge chamber 223 via oxidizing gas discharge gaps 235b, which will be described later, to the oxidizing gas discharge branch pipes 214 via the oxidizing gas discharge holes 233b. The oxidizing gas discharge branch pipes 214 communicates with the oxidizing gas discharge pipe 213, which will be described later. The oxidizing gas discharge pipe 213 discharges the exhaust oxidizing gas supplied from the oxidizing gas discharge branch pipes 214 to the outside of the fuel cell module.

The upper tube plate 225a is fixed to the side plate of the fuel gas supply chamber casing 229a between the top plate of the fuel gas supply chamber casing 229a and the upper insulation 227a so that the upper tube plate 225a, the top plate of the fuel gas supply chamber casing 229a, and the upper insulation 227a are substantially parallel to each other. In addition, the upper tube plate 225a has a plurality of holes corresponding to the number of the plurality of cell stacks 101 provided in the SOFC cartridge 203 such that the plurality of cell stacks 101 are respectively inserted through the holes. The upper tube plate 225a ensures gas tightness using any one or both of a seal member and an adhesive member provided for the one terminal of each of the plurality of cell stacks 101.

The lower tube plate 225b is fixed to the side plate of the fuel gas discharge chamber casing 229b between the bottom plate of the fuel gas discharge chamber casing 229b and the lower insulation 227b so that the lower tube plate 225b, the bottom plate of the fuel gas discharge chamber casing 229b, and the lower insulation 227b are substantially parallel to each other. In addition, the lower tube plate 225b has a plurality of holes corresponding to the number of the plurality of cell stacks 101 provided in the SOFC cartridge 203 such that the plurality of cell stacks 101 are respectively inserted through the holes. The lower tube plate 225b ensures gas tightness using any one or both of a seal member and an adhesive member provided for the one terminal of each of the plurality of cell stacks 101.

The upper insulation 227a is disposed at the lower terminal of the oxidizing gas discharge chamber casing 230b so as to cause the upper insulation 227a, the top plate of the oxidizing gas discharge chamber casing 230b, and the upper tube plate 225a to be substantially parallel to each other and is fixed to the side plate of the oxidizing gas discharge chamber casing 230b. In addition, the upper insulation 227a is provided with a plurality of holes corresponding to the number of the plurality of cell stacks 101 provided in the SOFC cartridge 203. The diameter of the hole is set to be greater than the outer diameter of the plurality of cell stacks 101. The upper insulation 227a has the oxidizing gas discharge gaps 235b formed between the inner surfaces of the holes and the outer surfaces of the plurality of cell stacks 101 inserted through the upper insulation 227a.

The upper insulation 227a separates the power generation chamber 215 and the oxidizing gas discharge chamber 223 from each other, and suppresses a reduction in the strength due to a temperature rise of the atmosphere around the upper tube plate 225a or increase in the degree of corrosion due to the oxidizing agent (oxygen or the like) contained in the oxidizing gas. In addition, the upper insulation 227a allows the exhaust oxidizing gas that passes through the power generation chamber 215 and is exposed to a high temperature to pass through the oxidizing gas discharge gaps 235b and be guided to the oxidizing gas discharge chamber 223.

According to this embodiment, in the structure of the SOFC cartridge 203 described above, the fuel gas and the oxidizing gas respectively flow through the inside of the cylindrical tube and the outside thereof of the plurality of cell stacks 101 while opposing each other. Accordingly, the exhaust oxidizing gas undergoes heat exchange with the fuel gas that passes through the inside of a substrate tube 103 and is supplied to the power generation chamber 215, is cooled to a temperature at which the reliability of the upper tube plate 225a made of a metal material or the like can be ensured, and is supplied to the oxidizing gas discharge chamber 223. In addition, the fuel gas is increased in temperature due to the heat exchange with the exhaust oxidizing gas discharged from the power generation chamber 215 and is supplied to the power generation chamber 215. As a result, without the use of a heater or the like, the fuel gas that is increased in temperature and pre-heated to an appropriate temperature for power generation can be supplied to the power generation chamber 215.

The lower insulation 227b is disposed at the upper terminal of the oxidizing gas supply chamber casing 230a so as to cause the lower insulation 227b, the bottom plate of the oxidizing gas supply chamber casing 230a, and the lower tube plate 225b to be substantially parallel to each other and is fixed to the side plate of the oxidizing gas supply chamber casing 230a. In addition, the lower insulation 227b is provided with a plurality of holes corresponding to the number of the plurality of cell stacks 101 provided in the SOFC cartridge 203. The diameter of the hole is set to be greater than the outer diameter of the plurality of cell stacks 101. The lower insulation 227b has the oxidizing gas supply gaps 235a formed between the inner surfaces of the holes and the outer surfaces of the plurality of cell stacks 101 inserted through the lower insulation 227b.

The lower insulation 227b separates the power generation chamber 215 and the oxidizing gas supply chamber 221 from each other, and suppresses a reduction in the strength due to a temperature rise of the atmosphere around the lower tube plate 225b or increase in the degree of corrosion due to the oxidizing agent contained in the oxidizing gas. In addition, the lower insulation 227b allows the oxidizing gas supplied to the oxidizing gas supply chamber 221 to pass through the oxidizing gas supply gaps 235a and be guided to the power generation chamber 215.

According to this embodiment, in the structure of the SOFC cartridge 203 described above, the fuel gas and the oxidizing gas respectively flow through the inside of the cylindrical tube and the outside thereof of the plurality of cell stacks 101 while opposing each other. Accordingly, the exhaust fuel gas that passes through the power generation chamber 215 via the inside of the cylindrical tube of the substrate tube 103 undergoes heat exchange with the oxidizing gas supplied to the power generation chamber 215, is cooled to a temperature at which the reliability of the lower tube plate 225b made of a metal material or the like can be ensured, and is supplied to the fuel gas discharge chamber 219. In addition, the oxidizing gas is increased in temperature due to the heat exchange with the exhaust fuel gas and is supplied to the power generation chamber 215. As a result, without the use of a heater or the like, the oxidizing gas that is increased in temperature to a temperature necessary for power generation can be supplied to the power generation chamber 215.

DC power generated by the power generation chamber 215 is drawn to the vicinity of the terminals of the plurality of cell stacks 101 by lead films 115 made of Ni/YSZ or the like and provided in the plurality of fuel cells 105, is thereafter collected by a current collector rod (not illustrated) of the SOFC cartridge 203 via a current collector plate (not illustrated), and is extracted to the outside of each of the SOFC cartridges 203. Regarding the power drawn to the outside of the SOFC cartridge 203 by the current collector rod, the powers respectively generated by the SOFC cartridges 203 are connected in a predetermined series-parallel connection and are drawn to the outside of the fuel cell module 201, converted into a predetermined AC power by a power conversion device (power conditioner) (not illustrated), and supplied to a power load. The power conversion device (power conditioner) is controlled by a control unit so that the current that flows to the outside from the fuel cell module 201 becomes equal to a predetermined current.

Figure 3:
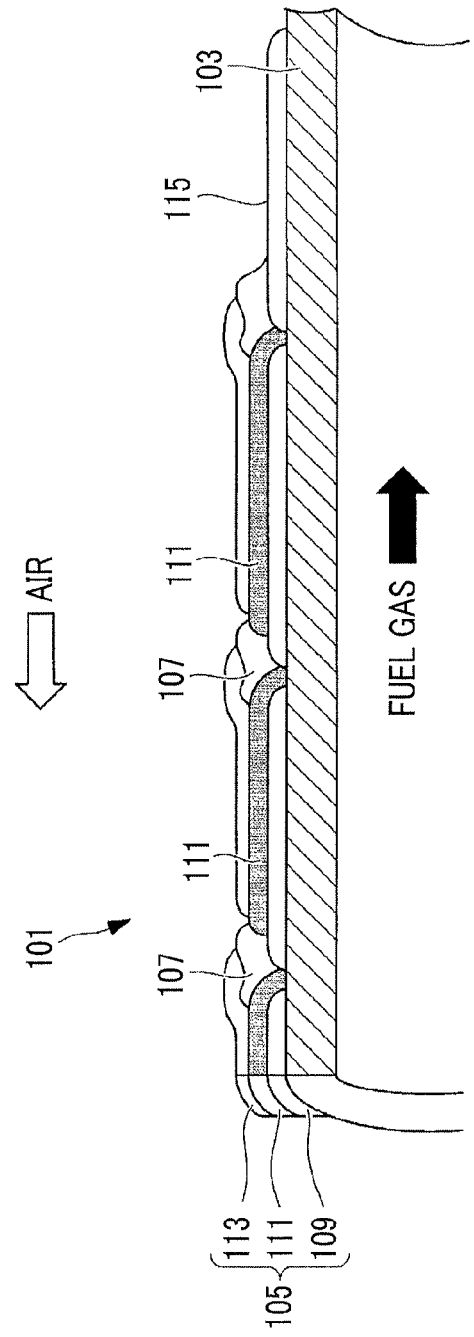
FIG. 3 is a sectional view illustrating a cell stack.

As illustrated in FIG. 3, the plurality of cell stacks 101 include the substrate tube 103 having a cylindrical shape, a plurality of fuel cells 105 formed on the outer peripheral surface of the substrate tube 103, and an interconnector 107 formed between the adjacent fuel cells 105. The fuel cell 105 is formed by stacking a fuel electrode (anode) 109, a solid electrolyte ill, and an air electrode (cathode) 113. In addition, the plurality of cell stacks 101 includes the lead film 115 which is electrically connected via the interconnector 107 to the air electrode (cathode) 113 of the fuel cell 105 that is formed at the outermost end in the axial direction of the substrate tube 103 among the plurality of fuel cells 105 formed on the outer peripheral surface of the substrate tube 103.

The substrate tube 103 is made of a porous material and, for example, is made of CaO-stabilized $ZrO_2$ (CSZ), $Y_2O_3$-stabilized $ZrO_2$ (YSZ), or $MgAl_2O_4$. The substrate tube 103 supports the fuel cells 105, the interconnectors 107, and the lead film 115 and allows the fuel gas supplied to the inner peripheral surface of the substrate tube 103 to be diffused to the fuel electrodes (anodes) 109 formed on the outer peripheral surface of the substrate tube 103 via pores of substrate tube 103.

The fuel electrode (anode) 109 is made of an oxide of a composite material of Ni and a zirconia-based electrolyte material, and for example, Ni/YSZ is used. In this case, in the fuel electrode (anode) 109, Ni which is the component of the fuel electrode (anode) 109 has catalytic activity for the fuel gas. This catalytic activity allows a reaction of the fuel gas supplied via the substrate tube 103, for example, a gas mixture of methane ($CH_4$) and water vapor so as to be reformed into hydrogen ($H_2$) and carbon monoxide (CO). In addition, the fuel electrode (anode) 109 allows the hydrogen ($H_2$) and carbon monoxide (CO) obtained through the reforming and oxygen ions ($O^{2-}$) supplied via the solid electrolyte 111 to electrochemically react with each other in the vicinity of the interface with the solid electrolyte 111, thereby generating water ($H_2O$) and carbon dioxide ($CO_2$). At this time, the fuel cell 105 generates power due to the electrons emitted from the oxygen ions.

As the solid electrolyte 111, YSZ having gas tightness with which gas is less likely to pass through and has high oxygen ion conductivity at a high temperature is generally used. The solid electrolyte 111 allows the oxygen ions ($O^{2-}$) generated at the air electrode (cathode) to move to the fuel electrode (anode).

The air electrode (cathode) 113 is, for example, made of an $LaSrMnO_3$-based oxide or a $LaCoO_3$-based oxide. The air electrode (cathode) 113 dissociates oxygen in the supplied oxidizing gas such as the air in the vicinity of the interface with the solid electrolyte 111 to generate oxygen ions ($O^{2-}$).

The interconnector 107 is made of a conductive perovskite oxide expressed by $M_{1-x}L_xTiO_3$ (M is an alkaline earth metal element and L is a lanthanoid element) based on $SrTiO_3$ or the like, as a close film such that the fuel gas and the oxidizing gas do not mix with each other. In addition, the interconnector 107 has stable electrical conductivity in both of an oxidizing atmosphere and a reducing atmosphere. The interconnector 107 electrically connects, in the adjacent fuel cells 105, the air electrode (cathode) 113 of one fuel cell 105 to the solid electrolyte 111 of the other fuel cell 105 so that the adjacent fuel cells 105 are connected in series. The lead film 115 needs to have electron conductivity and have a similar coefficient of thermal expansion to the other materials included in the plurality of cell stacks 101, and is thus made of a composite material of Ni and a zirconia-based electrolyte material, such as Ni/YSZ. The lead film 115 draws the DC power generated by the plurality of fuel cells 105 connected in series by the interconnector to the vicinity of the terminal of the plurality of cell stacks 101.

Figure 4:
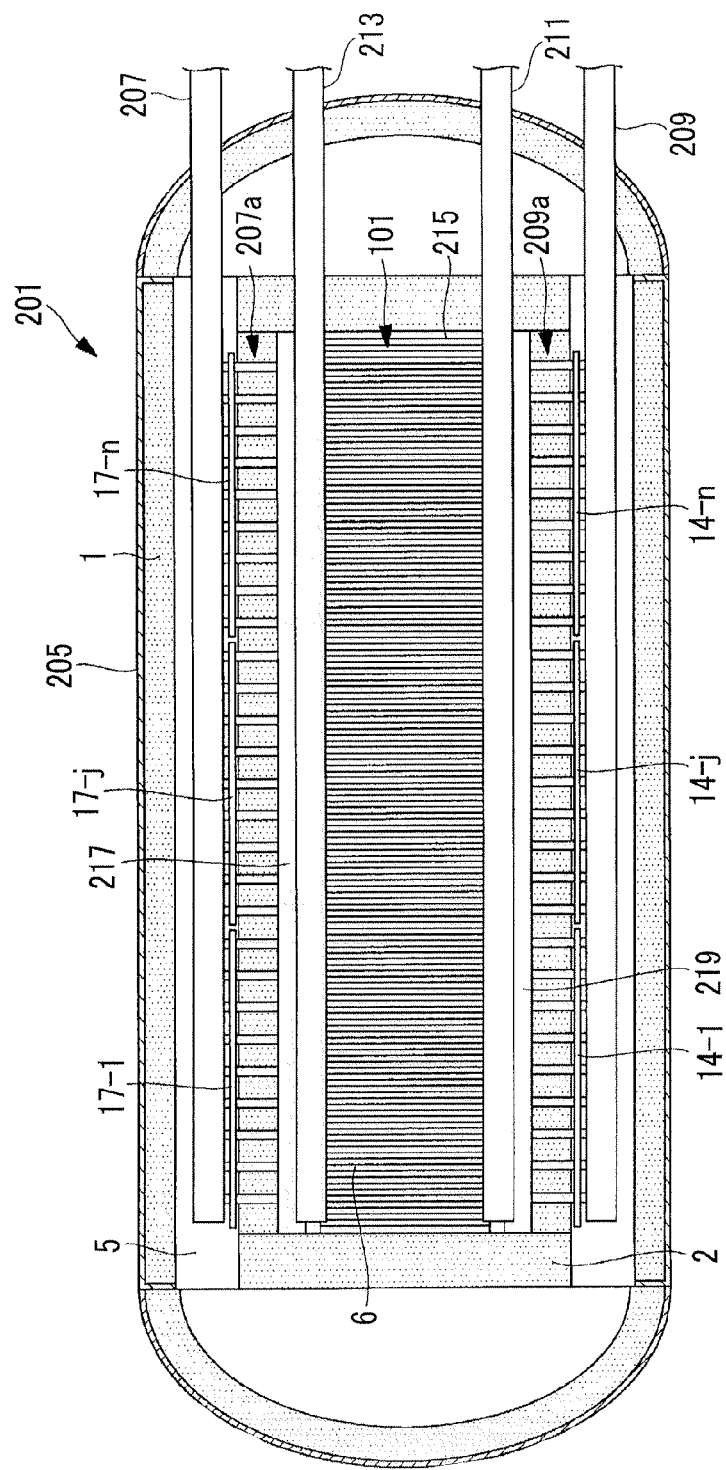
FIG. 4 is a longitudinal sectional view illustrating a convection flow rate adjusting device in a first embodiment.
Figure 5:
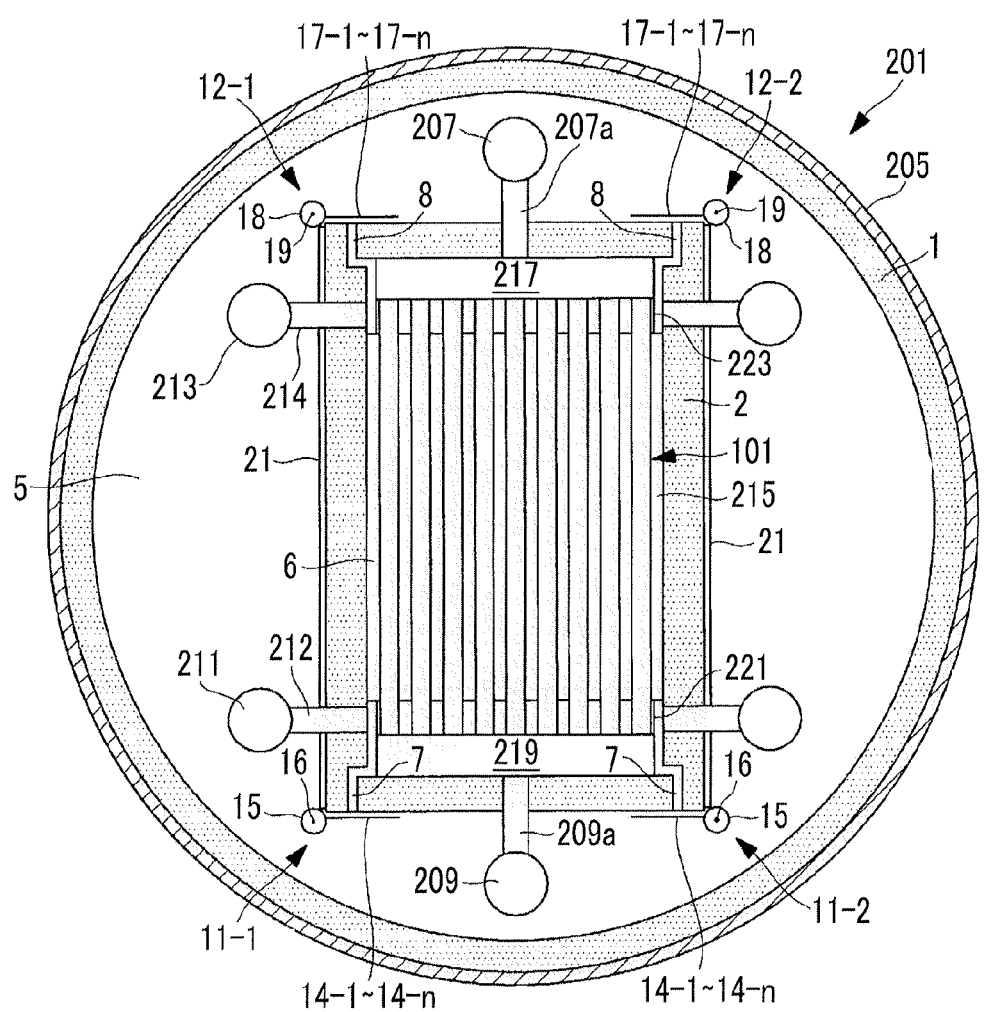
FIG. 5 is a transverse sectional view illustrating the convection flow rate adjusting device of FIG. 4.

As illustrated in FIG. 4, the fuel cell module 201 includes the oxidizing gas supply pipe 211 and the oxidizing gas discharge pipe 213 described above. In addition, as illustrated in FIG. 5, the fuel cell module 201 includes the plurality of oxidizing gas supply branch pipes 212 and the plurality of oxidizing gas discharge branch pipes 214.

The fuel cell module 201 further includes the pressure vessel internal insulation 1 and a cell side insulation 2 (insulation board). The pressure vessel internal insulation 1 is disposed to cover the inner peripheral wall of the pressure vessel 205. The cell side insulation 2 is formed by laminating and joining a plurality of boards (or plates) formed of an insulating material together. The cell side insulation 2 is disposed inside the pressure vessel 205 so as to surround the plurality of SOFC cartridges 203. At this time, the cell side insulation 2 partitions the inside of the pressure vessel 205 into an outer space 5 and an inner space 6 to separate the outer space 5 and the inner space 6 from each other. That is, the outer space 5 is formed between the pressure vessel 205 and the cell side insulation 2. The inner space 6 is surrounded by the cell side insulation 2 and has the plurality of SOFC cartridges 203 disposed therein. Therefore, the inner space 6 is connected to the power generation chambers 215 of the plurality of SOFC cartridges 203.

In the cell side insulation 2, a plurality of lower flow passages 7 and a plurality of upper flow passages 8 are formed. There may be a case where the plurality of lower flow passages 7 are formed by gaps between a plurality of layers that are unavoidably formed when the cell side insulation 2 is produced, or there may be a case where they are intentionally formed for this purpose. The plurality of lower flow passages 7 are formed in the insulation disposed in the horizontal plane vertically below the plurality of cell stacks 101 in the cell side insulation 2. The plurality of lower flow passages 7 connect the regions vertically below the plurality of cell stacks 101 in the outer space 5 to the regions vertically below the plurality of cell stacks 101 in the inner space 6. Furthermore, the plurality of lower flow passages 7, are bent such that thermal radiation from the plurality of cell stacks 101 is not directly emitted from the inner space 6 toward the outer space 5.

Similar to the plurality of lower flow passages 7, there may be a case where the plurality of upper flow passages 8 are formed by gaps between a plurality of layers that are unavoidably formed when the cell side insulation 2 is produced, or there may be a case where they are intentionally formed for this purpose. The plurality of upper flow passages 8 are formed in the insulation disposed in the horizontal plane vertically above the plurality of cell stacks 101 in the cell side insulation 2. The plurality of upper flow passages 8 connect the regions vertically above the plurality of cell stacks 101 in the inner space 6 to regions vertically above the plurality of cell stacks 101 in the outer space 5. Furthermore, the plurality of upper flow passages 8 are bent such that thermal radiation from the plurality of cell stacks 101 is not directly emitted toward the outer space 5.

Figure 6:
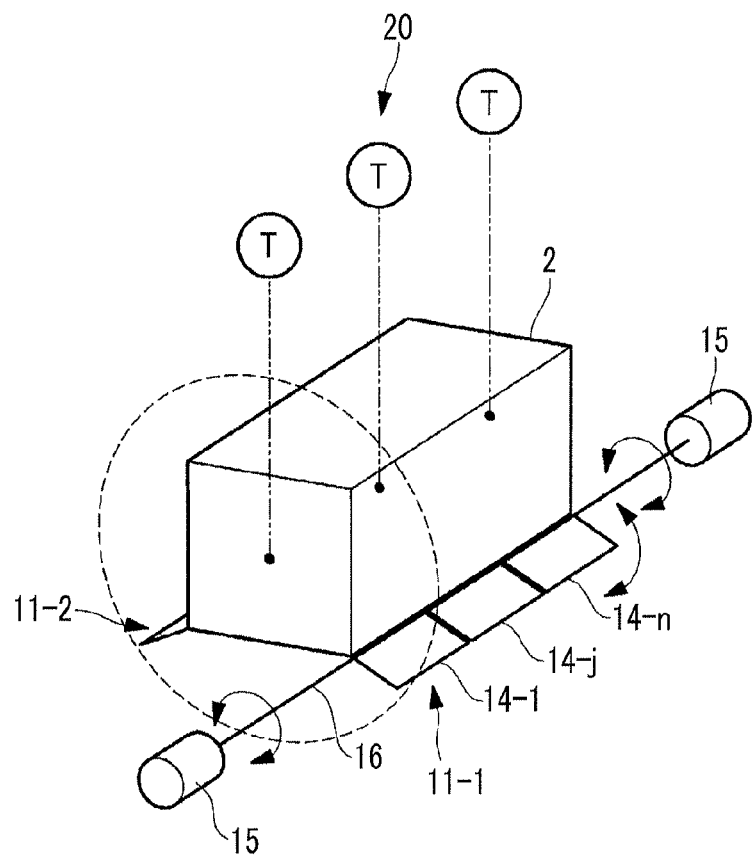
FIG. 6 is a perspective view illustrating a lower damper.

The fuel cell module 201 further includes convection flow rate adjusting devices. As illustrated in FIG. 5, the convection flow rate adjusting devices include two lower dampers 11-1 and 11-2 and two upper dampers 12-1 and 12-2. Each lower damper 11-$i$ ($i$=1, 2) of the two lower dampers 11-1 and 11-2 includes a plurality of blades 14-1 to 14-$n$ ($n$=2, 3, 4, ...) and a plurality of actuators 15. As illustrated in FIG. 6, each of the plurality of blades 14-1 to 14-$n$ is formed as a rectangular plate. Here, the inner space 6 is divided into a plurality of the regions arranged in the longitudinal direction of the horizontal direction of the pressure vessel 205. The plurality of blades 14-1 to 14-$n$ are arranged in the direction in which the plurality of regions of the inner space 6 are arranged to respectively correspond to the plurality of divided regions of the inner space 6 and are supported to rotate around a rotational axis 16 which is parallel to the direction in which the plurality of regions of the inner space 6 are arranged. The blade 14-$j$ ($j$=1, 2, 3, ..., n) corresponding to one region of the inner space 6 among the plurality of blades 14-1 to 14-$n$ rotates around the rotational axis 16 to open and close a part of the lower flow passages which is connected to the one region among the plurality of lower flow passages 7. The plurality of actuators 15 respectively correspond to the plurality of blades 14-1 to 14-$n$. The actuator corresponding to the blade 14-$j$ among the plurality of actuators 15 rotates the blade 14-$j$ around the rotational axis 16 and disposes the blade 14-$j$ at a predetermined angle.

Similar to each of the two lower dampers 11-1 and 11-2, each of the two upper dampers 12-1 and 12-2 includes a plurality of blades 17-1 to 17-$n$ and a plurality of actuators 18 as illustrated in FIG. 5. Similarly to the plurality of blades 14-1 to 14-$n$, the plurality of blades 17-1 to 17-$n$ are formed as rectangular plates, are arranged in the longitudinal direction of the horizontal direction of the pressure vessel 205, and are supported to rotate around a rotational axis 19 which is parallel to the longitudinal direction of the horizontal direction of the pressure vessel 205. The blade 17-$j$ corresponding to one region of the inner space 6 among the plurality of blades 17-1 to 17-$n$ rotates around the rotational axis 19 to open and close a part of the upper flow passages which is connected to the one region among the plurality of upper flow passages 8. The plurality of actuators 18 respectively correspond to the plurality of blades 17-1 to 17-$n$. The actuator corresponding to the blade 17-$j$ among the plurality of actuators 18 rotates the blade 17-$j$ around the rotational axis 19 and disposes the blade 17-$j$ to allow the blade 17-$j$ to be at a predetermined angle.

The fuel cell module 201 further includes a plurality of temperature measurement devices 20, and the control unit (not illustrated) is provided. The plurality of temperature measurement devices 20 correspond to the plurality of divided regions of the inner space 6 and are connected to the control unit to transmit information thereto. The temperature measurement device corresponding to one region among the plurality of temperature measurement devices 20 measures the temperature of the cell stack disposed in the one region among the plurality of cell stacks 101.

When the temperature of the cell stack measured by the temperature measurement device becomes higher than a predetermined temperature range, the control unit controls the plurality of actuators 15 to increase the flow rate of the oxidizing gas that flows through a part of the lower flow passages in the vicinity of the cell stack at the high temperature among the plurality of lower flow passages 7, and controls the plurality of actuators 18 to increase the flow rate of the oxidizing gas that flows through a part of the upper flow passages in the vicinity of the cell stack at the high temperature among the plurality of upper flow passages 8. When the temperature of the cell stack measured by the temperature measurement device becomes lower than the predetermined temperature range, the control unit controls the plurality of actuators 15 to reduce the flow rate of the oxidizing gas that flows through a part of the lower flow passages in the vicinity of the cell stack at the low temperature among the plurality of lower flow passages 7, and controls the plurality of actuators 18 to increase the flow rate of the oxidizing gas that flows through a part of the upper flow passages in the vicinity of the cell stack at the low temperature among the plurality of upper flow passages 8.

As described above, the plurality of convection flow rate adjusting devices are separately arranged in the longitudinal direction of the pressure vessel 205 to respectively adjust opening degrees. However, in case where a small temperature distribution is provided in the longitudinal direction, the plurality of convection flow rate adjusting devices may be integrally moved by a single actuator. In addition, in case where temperature adjustment is sufficiently performed only by adjusting the rate of flow toward the convection flow rate adjusting devices in a lower section, it may be considered that the convection flow rate adjusting devices in an upper section are not installed.

In the above-described configurations, according to this embodiment, the following operational effects are exhibited. The fuel cell module 201 generates power through a chemical reaction between the fuel gas supplied via the fuel gas supply pipe 207 and the oxidizing gas supplied via the oxidizing gas supply pipe 211, discharges the exhaust fuel gas via the fuel gas discharge pipe 209, and discharges the exhaust oxidizing gas via the oxidizing gas discharge pipe 213. As the fuel cell module 201 generates power, the plurality of cell stacks 101 generate heat and thus heat the oxidizing gas in the power generation chambers 215 in the inner space 6, thereby forming an ascending flow of the oxidizing gas in the power generation chambers 215 in the inner space 6.

The oxidizing gas heated by the plurality of cell stacks 101 further rises in the inner space 6 and thus forms an ascending flow of the oxidizing gas in the inner space 6. A part of the oxidizing gas rising in the inner space 6 passes through the plurality of upper flow passages 8 and flows toward the outer space 5 from the inner space 6. The part of the oxidizing gas that flows toward the outer space 5 via the plurality of upper flow passages 8 transfers heat to the air outside of the fuel cell module 205 via the pressure vessel 205 and the pressure vessel internal insulation 1 and is thus cooled and reduced in temperature. In the outer space 5, the oxidizing gas that is cooled and reduced in temperature has a lower temperature and a higher density than those of the oxidizing gas in the inner space 6 and thus moves downward in the outer space 5 due to natural circulation caused by the gas density differences. Since a slight pressure reduction occurs in the inner space 6 as the part of the oxidizing gas is discharged from the plurality of upper flow passages 8 toward the outer space 5, the oxidizing gas that moves downward in the outer space 5 passes through the plurality of lower flow passages 7 and flows toward the inner space 6 from the outer space 5. That is, in the pressure vessel 205, as the plurality of cell stacks 101 generate power, natural convection which is a flow of the oxidizing gas that rises in the inner space 6 and moves downward in the outer space 5 occurs.

The convection flow rate adjusting devices adjust the flow rate of the oxidizing gas that flows between the outer space 5 and the inner space 6 so that the plurality of cell stacks 101 are controlled to maintain appropriate temperatures when the plurality of cell stacks 101 generate power. That is, when an arbitrary cell stack among the plurality of cell stacks 101 is at a higher temperature than the predetermined temperature range, the convection flow rate adjusting devices adjust the angles of the plurality of blades 14-1 to 14-*n* of the two lower dampers 11-1 and 11-2 to increase the flow rate of the oxidizing gas that passes through the lower flow passage in the vicinity of the cell stack at the high temperature among the plurality of lower flow passages 7, and adjust the angles of the plurality of blades 17-1 to 17-*n* of the two upper dampers 12-1 and 12-2 to increase the flow rate of the oxidizing gas that passes through the upper flow passage in the vicinity of the cell stack at the high temperature among the plurality of upper flow passages 8.

The oxidizing gas that flows in the outer space 5 is increased in temperature as the amount of oxidizing gas that flows from the inner space 6 toward the outer space 5 via the plurality of upper flow passages 8 increases. As the temperature of the oxidizing gas that flows in the outer space 5 increases, a temperature difference from the air outside of the pressure vessel 205 via the pressure vessel 205 and the pressure vessel internal insulation 1 is increased, and thus the heat exchange amount of heat transferred to the outside air is increased, thereby increasing a cooling amount. The oxidizing gas cooled in the outer space 5 moves downward in the outer space 5, passes through the plurality of lower flow passages 7, flows from the outer space 5 to the inner space 6, and flows into the power generation chambers 215. As the oxidizing gas cooled in the outer space 5 flows into the power generation chambers 215, the plurality of cell stacks 101 cool the fuel cell module 201. As a result, the convection flow rate adjusting devices cool the corresponding cell stack at a higher temperature than the predetermined temperature range with high efficiency and thus can return the temperature of the cell stack to the predetermined temperature range. In the fuel cell module 201, the temperatures of all the cell stacks are within the predetermined temperature range or lower and are equalized. Therefore, power generation performance is enhanced.

When an arbitrary cell stack among the plurality of cell stacks 101 is at a lower temperature than the predetermined temperature range, the convection flow rate adjusting devices adjust the angles of the plurality of blades 14-1 to 14-*n* of the two lower dampers 11-1 and 11-2 to reduce the flow rate of the oxidizing gas that passes through the lower flow passage in the vicinity of the cell stack at the low temperature among the plurality of lower flow passages 7 (operate in a closing direction to narrow the flow passage), and adjust the angles of the plurality of blades 17-1 to 17-*n* of the two upper dampers 12-1 and 12-2 to reduce the flow rate of the oxidizing gas that passes through the upper flow passage 8 in the vicinity of the cell stack at the high temperature (operate in a closing direction to narrow the flow passage).

The oxidizing gas that flows in the outer space 5 is decreased in temperature as the amount of oxidizing gas that flows from the inner space 6 toward the outer space 5 via the plurality of upper flow passages 8 is reduced. As the temperature of the oxidizing gas that flows in the outer space 5 reduces, the heat exchange amount transferred to the air outside of the pressure vessel 205 is reduced. The oxidizing gas cooled in the outer space 5 moves downward in the outer space 5, passes through the plurality of lower flow passages 7, and flows from the outer space 5 to the inner space 6, thereby cooling the plurality of cell stacks 101 of the fuel cell module 201. However, as the rate of flow of the oxidizing gas that is reduced in temperature from the outer space 5 is reduced, cooling effects are reduced, and thus the temperature of the cell stack 101 at a lower temperature than the predetermined temperature range is increased. As a result, the convection flow rate adjusting devices prevent the cell stack at the low temperature from being excessively cooled by reducing the cooling amount of the cell stack at a lower temperature than the predetermined temperature range due to the oxidizing gas that flows between the outer space 5 and the inner space 6, thereby returning the temperature of the cell stack to the predetermined temperature range. In the fuel cell module 201, the temperatures of all the cell stacks are within the predetermined temperature range or lower and are equalized. Therefore, power generation performance is enhanced.

Accordingly, in the fuel cell module 201, as the convection flow rate adjusting devices are operated as described above, the temperatures of the plurality of cell stacks 101 are appropriately controlled in the predetermined temperature range and thus the temperatures of the cell stacks in the entirety of the fuel cell module 201 are within the predetermined temperature range or lower and are equalized. The plurality of cell stacks 101 are allowed to appropriately generate power without causing variations of the power generation performance due to the operating temperatures, thereby enhancing the power generation performance.

The fuel cell module 201 further prevents a gas flow between the inner space 6 and the outer space 5 via gaps formed in the insulation disposed along the vertical plane in the cell side insulation 2 by using a plurality of seal plates 21 formed in a plate shape, and thus can adjust the flow rate of the oxidizing gas that flows between the outer space 5 and the inner space 6, thereby appropriately controlling the temperatures of the plurality of cell stacks 101. In addition, in the fuel cell module 201, in case where necessary temperature adjustment can be performed without an adverse effect on the flow rate of the oxidizing gas that flows between the outer space 5 and the inner space 6 even when the seal plates 21 are absent, it may be considered that the seal plates 21 are not installed.

The fuel cell module 201 may be used in combination with a GTCC (Gas Turbine Combined Cycle power generation) or an MGT (Micro Gas Turbine) to be applied to a combined power generation system. In the combined power generation system, the exhaust fuel gas and the exhaust oxidizing gas discharged from the fuel cell module 201 are supplied to the gas turbine, and the air compressed by the power generated by the gas turbine is supplied to the fuel cell module 201 as the oxidizing gas.

In the combined power generation system, in case where the fuel cell module 201 is to be further cooled, a method of supplying a larger amount of oxidizing gas to the fuel cell module 201 or a method of re-circulating the exhaust oxidizing gas discharged from the fuel cell module 201 using an exhaust air re-circulation blower so as to be cooled and supplied to the fuel cell module 201 is considered.

The number of fuel cell modules 201 that can be installed per gas turbine is determined depending on the maximum flow rate of the oxidizing gas from the gas turbine. According to the fuel cell module 201 which employs the cooling method of the present invention, in the combined power generation system, even when a smaller amount of oxidizing gas than that in the related art is supplied to the fuel cell module 201, the fuel cell module 201 can be sufficiently cooled. Therefore, the number of fuel cell modules 201 installed per gas turbine can be increased.

According to the method of re-circulating the exhaust oxidizing gas discharged from the fuel cell module 201 using the exhaust air re-circulation blower so as to be cooled and supplied to the fuel cell module 201, there is a need to add the exhaust air re-circulation blower for re-circulating the exhaust air at a high temperature and a facility for cooling the oxidizing gas to the combined power generation system. According to the fuel cell module 201, even when the facilities are not added to the combined power generation system, the fuel cell module 201 can be sufficiently cooled, thereby reducing the manufacturing cost.

In addition, the plurality of actuators 15 and 18 can be replaced with a plurality of actuators which rotate the plurality of blades 14-1 to 14-$n$ and 17-1 to 17-$n$. As the actuators, a power cylinder such as an air cylinder is exemplified. Even in case where such an actuator is provided, the convection flow rate adjusting devices can adjust the flow rate of the oxidizing gas that flows between the outer space 5 and the inner space 6 in the same manner, and thus can appropriately control the temperatures of the plurality of cell stacks 101.

Since the plurality of lower flow passages 7 are bent, thermal radiation from the plurality of cell stacks 101 is not directly emitted toward the plurality of blades 14-1 to 14-$n$ of the two lower dampers 11-1 and 11-2. Therefore, the plurality of blades 14-1 to 14-$n$ of the two lower dampers 11-1 and 11-2 are prevented from being heated by the thermal radiation from the plurality of cell stacks 101, and are thus prevented from being burned by the thermal radiation. Furthermore, since the plurality of upper flow passages 8 are bent, thermal radiation from the plurality of cell stacks 101 is not directly emitted toward the plurality of blades 17-1 to 17-$n$ of the two upper dampers 12-1 and 12-2. Therefore, the plurality of blades 17-1 to 17-$n$ of the two upper dampers 12-1 and 12-2 are prevented from being heated by the thermal radiation from the plurality of cell stacks 101, and are thus prevented from being burned by the thermal radiation.

Since the plurality of blades 14-1 to 14-$n$ of the two lower dampers 11-1 and 11-2 are provided in an environment in which they are not heated by the thermal radiation from the plurality of cell stacks 101, the limitations of the used materials thereof can be released. Therefore, there is no need to use a highly heat-resistant alloy material or a ceramic material, and the range of selection for the material, including a stainless steel material such as general SUS304 and a coated and rust-proofed steel sheet such as SS400, is widened, which is preferable.

In case where a countermeasure to the radiant heat from the plurality of cell stacks 101 is applied to the plurality of blades 17-1 to 17-$n$, or when problems due to the thermal radiation from the plurality of cell stacks 101 do not occur in the plurality of blades 17-1 to 17-$n$, the plurality of upper flow passages 8 do not need to be formed to be bent and may be formed in a straight line shape. In addition, in case where a countermeasure to the radiant heat from the plurality of cell stacks 101 is applied to the plurality of blades 14-1 to 14-$n$, or when problems due to the thermal radiation from the plurality of cell stacks 101 do not occur in the plurality of blades 14-1 to 14-$n$, the plurality of lower flow passages 7 do not need to be formed to be bent and may be formed in a straight line shape. Even in case where the plurality of lower flow passages 7 or the plurality of upper flow passages 8 are formed in a straight line shape, the fuel cell module 201 can control the temperatures of the plurality of cell stacks 101 by adjusting the flow rate of the oxidizing gas that flows between the outer space 5 and the inner space 6.

In addition, the plurality of lower flow passages 7 may also be formed in the insulation disposed in the vertical plane in the cell side insulation 2 on the vertically lower side from the center of the plurality of cell stacks 101 in the axial direction thereof. The plurality of upper flow passages 8 may also be formed in the insulation disposed in the vertical plane in the cell side insulation 2 on the vertically upper side from the center of the plurality of cell stacks 101 in the axial direction thereof. The oxidizing gas that is present in the inner space 6 formed by the pressure vessel 205 flows between the outer space 5 and the inner space 6 even in case where the plurality of lower flow passages 7 and the plurality of upper flow passages 8 are disposed as described above. Therefore, even in case where the plurality of lower flow passages 7 and the plurality of upper flow passages 8 are disposed as described above, the fuel cell module 201 can adjust the flow rate of the oxidizing gas that flows between the outer space 5 and the inner space 6, thereby appropriately controlling the temperatures of the plurality of cell stacks 101.

The plurality of blades 17-1 to 17-$n$ of the two upper dampers 12-1 and 12-2 may use the same material as that of the plurality of blades 14-1 to 14-$n$ of the two lower dampers 11-1 and 11-2. However, the oxidizing gas from the inner space 6 directly comes into contact with the surface toward the plurality of upper flow passages 8 and thus the temperature of the surface is easily increased. Therefore, the surface may be coated with an insulating member. The oxidizing gas that passes through the plurality of upper flow passages 8 from the inner space 6 toward the outer space 5 is at a higher temperature than that of the oxidizing gas that passes through the plurality of lower flow passages 7 from the outer space 5 toward the inner space 6. Therefore, the plurality of blades 17-1 to 17-$n$ of the two upper dampers 12-1 and 12-2 are exposed to the oxidizing gas at a higher temperature compared to the plurality of blades 14-1 to 14-$n$ of the two lower dampers 11-1 and 11-2. Particularly, in case where a material having sufficient heat resistance cannot be used as the use material of the plurality of blades 17-1 to 17-$n$ of the two upper dampers 12-1 and 12-2, a part that needs heat resistance is coated with an insulating member while using a cheap material for the blades themselves, thereby appropriately preventing from burnout due to the oxidizing gas that passes through the plurality of upper flow passages 8 from the inner space 6 toward the outer space 5.

In addition, the heat resistance of the plurality of blades 17-1 to 17-$n$ of the two upper dampers 12-1 and 12-2 may be enhanced by other means than coating the blades with the insulating member. For example, the plurality of blades 17-1 to 17-$n$ of the two upper dampers 12-1 and 12-2 may also be formed of a highly heat-resistant material having higher heat resistance than that of the material for the plurality of blades 14-1 to 14-$n$ of the two lower dampers 11-1 and 11-2. As the highly heat-resistant material, HASTELLOY (registered trademark) is exemplified. Since the heat resistance of the two upper dampers 12-1 and 12-2 is more enhanced than that of the two lower dampers 11-1 and 11-2 in the convection flow rate adjusting devices, the manufacturing cost can be reduced compared to other convection flow rate adjusting devices in which the two lower dampers 11-1 and 11-2 use a material having the same degree of heat resistance as that of the two upper dampers 12-1 and 12-2.

Figure 7:
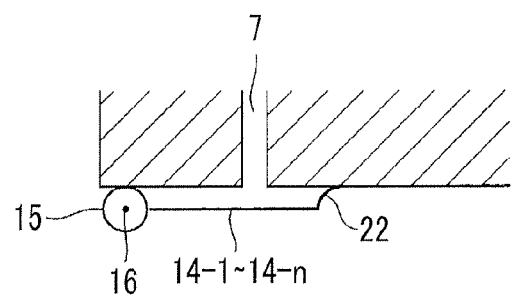
FIG. 7 is a side view illustrating a blade of the lower damper.

As illustrated in FIG. 7, in the lower damper 11-i or the like, a thin film seal plate 22 may be added to the tip end of the plurality of blades 14-1 to 14-n. The thin film seal plate 22 is elastically deformed by coming into contact with the cell side insulation 2 in case where the plurality of blades 14-1 to 14-n close the plurality of lower flow passages 7, thereby coming into close contact with the cell side insulation 2. The lower damper 11-i has enhanced sealability with which gas flow is impeded, as the thin film seal plate 22 comes into close contact with the cell side insulation 2, and thus can reliably close the plurality of lower flow passages 7. The convection flow rate adjusting devices stop the natural convection of the oxidizing gas that is circulated between the outer space 5 and the inner space 6 as the lower damper 11-i reliably closes the plurality of lower flow passages 7, thereby appropriately controlling the temperature control of the plurality of cell stacks 101.

Figure 8:
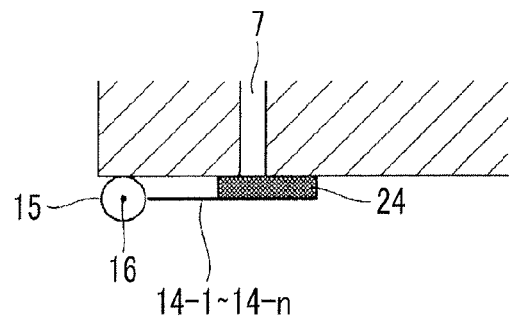
FIG. 8 is a side view illustrating another blade of the lower damper.

Furthermore, as illustrated in FIG. 8, in the lower damper 11-i, a cushion 24 may be added to surfaces of the plurality of blades 14-1 to 14-n, which face the plurality of lower flow passages 7. The cushion 24 is formed of a sheet formed by consolidating fibers formed of an insulating material or fine metal wires. The cushion 24 is deformed by coming into contact with the cell side insulation 2 in case where the plurality of blades 14-1 to 14-n close the plurality of lower flow passages 7, thereby coming into close contact with the cell side insulation 2. The lower damper 11-i has enhanced sealability with which gas flow is impeded, as the cushion 24 comes in close contact with the openings of the plurality of lower flow passages 7 on the outer space 5 side, and thus can reliably close the plurality of lower flow passages 7. The convection flow rate adjusting devices stop the natural convection of the oxidizing gas that is circulated between the outer space 5 and the inner space 6 as the lower damper 11-i reliably closes the plurality of lower flow passages 7, thereby appropriately controlling the temperature control of the plurality of cell stacks 101.

The plurality of blades 14-1 to 14-n may be formed of a material that has flexibility in case where the lower damper 11-i closes the plurality of lower flow passages 7. As the material, a carbon resin is exemplified. At this time, the plurality of blades 14-1 to 14-n are deformed by coming into contact with the cell side insulation 2 in case where the plurality of blades 14-1 to 14-n close the plurality of lower flow passages 7, thereby coming into close contact with the cell side insulation 2. The lower damper 11-i has enhanced sealability with which gas flow is impeded, as the plurality of blades 14-1 to 14-n come in close contact with the openings of the plurality of lower flow passages 7 on the outer space 5 side, and thus can reliably close the plurality of lower flow passages 7. The convection flow rate adjusting devices stop the natural convection of the oxidizing gas that is circulated between the outer space 5 and the inner space 6 as the lower damper 11-i reliably closes the plurality of lower flow passages 7, thereby appropriately controlling the temperature control of the plurality of cell stacks 101.

Similar to the two lower dampers 11-1 and 11-2, the thin film seal plate 22 and the cushion 24 may also be added to the two upper dampers 12-1 and 12-2. At this time, the convection flow rate adjusting devices can more reliably adjust the flow rate of the oxidizing gas that flows between the outer space 5 and the inner space 6 compared to the case where the thin film seal plate 22 or the cushion 24 is added only to the two lower dampers 11-1 and 11-2, thereby more reliably controlling the temperature control of the plurality of cell stacks 101.

The plurality of blades 14-1 to 14-n do not necessarily rotate around the single rotational axis 16, and for example, may be supported to rotate around a plurality of different rotational axes. The plurality of blades 17-1 to 17-n also do not necessarily rotate around the single rotational axis 19, and for example, may be supported to rotate around a plurality of different rotational axes. Even in this case, the fuel cell modules 201 can appropriately control the temperatures of the plurality of cell stacks 101 so as to reduce the temperature distribution in the horizontal direction of the power generation chamber 215 as the plurality of blades 14-1 to 14-n separately adjust the flow rates of the gases that respectively pass through the plurality of lower flow passages 7, or as the plurality of blades 17-1 to 17-n separately adjust the flow rates of the gases that respectively pass through the plurality of upper flow passages 8.

When the temperature distribution in the horizontal direction of the power generation chamber 215 is small, the plurality of blades 14-1 to 14-n do not need to be disposed at different angles, and may be moved simultaneously, or may also be replaced with a single blade. In addition, when the temperature distribution in the horizontal direction of the power generation chamber 215 is small, the plurality of blades 17-1 to 17-n also do not need to be disposed at different angles, and may be moved simultaneously, or may also be replaced with a single blade. Even in case where the plurality of blades 14-1 to 14-n and 17-1 to 17-n are operated simultaneously, or even in case where the plurality of blades 14-1 to 14-n and 17-1 to 17-n are formed as a single blade, the fuel cell module 201 can control the temperatures of the plurality of cell stacks 101 by adjusting the flow rate of the oxidizing gas that flows between the outer space 5 and the inner space 6.

In addition, when the flow rate of the oxidizing gas that flows between the outer space 5 and the inner space 6 can be sufficiently adjusted only by the two lower dampers 11-1 and 11-2, the two upper dampers 12-1 and 12-2 may be omitted. Even in case where the two upper dampers 12-1 and 12-2 are omitted, the fuel cell module 201 can control the temperatures of the plurality of cell stacks 101 by adjusting the flow rate of the oxidizing gas that flows between the outer space 5 and the inner space 6 using the two lower dampers 11-1 and 11-2.

Second Embodiment

Figure 9:
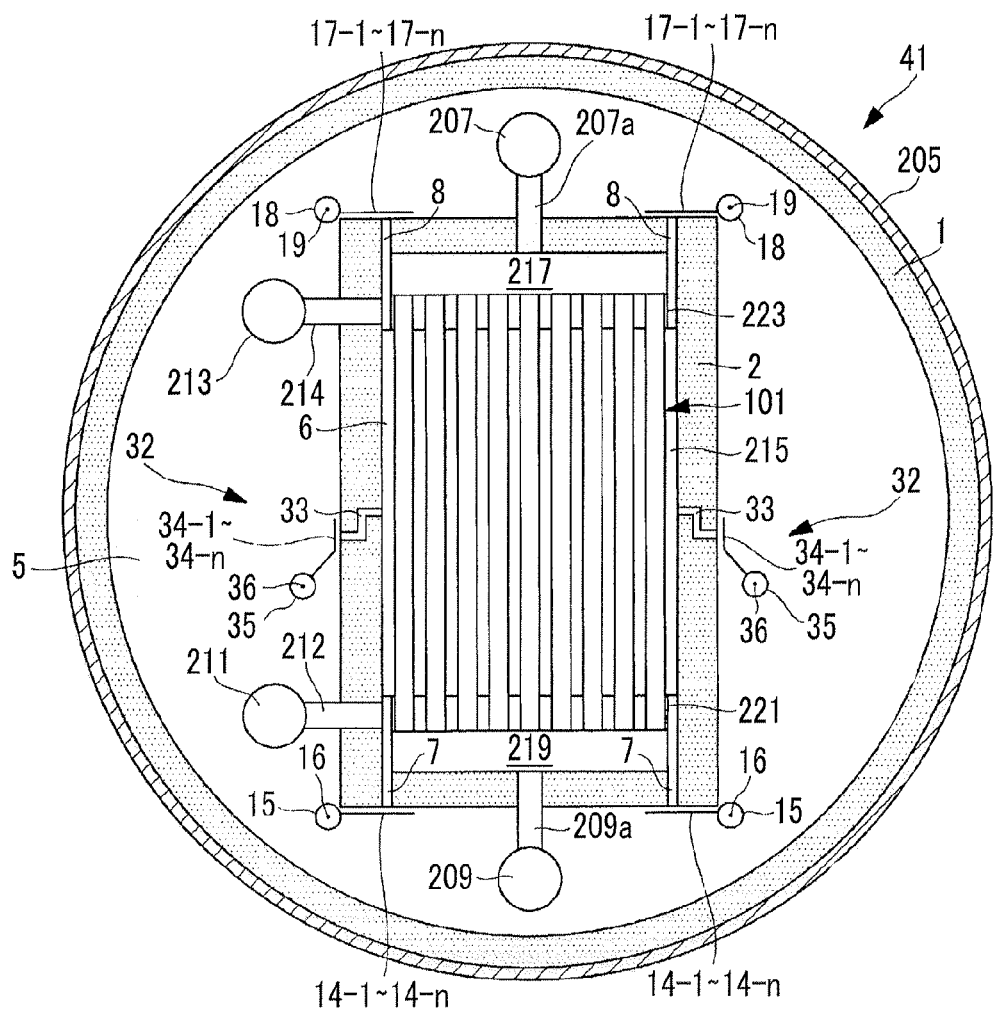
FIG. 9 is a transverse sectional view illustrating a convection flow rate adjusting device in a second embodiment.

As illustrated in FIG. 9, a fuel cell module 41 of a second embodiment further includes intermediate dampers 32. At this time, a plurality of intermediate flow passages 33 are formed in the cell side insulation 2. The plurality of intermediate flow passages 33 are formed by gaps that are unavoidably formed when the cell side insulation 2 is produced, or intentionally formed for this purpose, and are formed at a position between the plurality of lower flow passages 7 and the plurality of upper flow passages 8 in the cell side insulation 2 to connect an intermediate position of the outer space 5 to an intermediate position of the inner space 6. Otherwise, excluding the plurality of intermediate flow passages 33, in the same manner as in the first embodiment, the seal plates 21 may be installed to block the gaps formed in the insulation formed in the vertical plane in the cell side insulation 2 and thus prevent a gas flow between the inner space 6 and the outer space 5 via the gaps.

The intermediate damper 32 is provided with a plurality of blades 34-1 to 34-$n$ and a plurality of actuators 35. Similar to the plurality of blades 14-1 to 14-$n$, the plurality of blades 34-1 to 34-$n$ are formed as rectangular plates, are arranged in the longitudinal direction of the horizontal direction of the pressure vessel 205, and are supported to rotate around a rotational axis 36 which is parallel to the longitudinal direction of the horizontal direction of the pressure vessel 205. The blade 34-$j$ corresponding to one region of the inner space 6 among the plurality of blades 34-1 to 34-$n$ rotates around the rotational axis 36 to open and close a part of the intermediate flow passages which is connected to the one region among the plurality of intermediate flow passages 33. The plurality of actuators 35 respectively correspond to the plurality of blades 34-1 to 34-$n$. The actuator corresponding to the blade 34-$j$ among the plurality of actuators 35 rotates the blade 34-$j$ around the rotational axis 36 and disposes the blade 34-$j$ so as to be at a predetermined angle.

When the upper portion of an arbitrary cell stack among the plurality of cell stacks 101 is at a higher temperature than the predetermined temperature range, the intermediate dampers 32 are controlled to increase the flow rate of the oxidizing gas that passes through the intermediate flow passage in the vicinity of the cell stack at the high temperature among the plurality of intermediate flow passages 33. Under this control, the fuel cell module 31 of the second embodiment can appropriately control the temperatures of the plurality of cell stacks 101 so as to reduce temperature differences in the height direction of the plurality of cell stacks 101 even in case where there are temperature differences in the height direction of the plurality of cell stacks 101.

When the fuel cell module 31 in the second embodiment is further combined with a GTCC or an MGT, the fuel cell module 31 can appropriately control the temperatures of the plurality of cell stacks 101. Therefore, as in the fuel cell module 201 in the first embodiment described above, the number of fuel cell modules per gas turbine can be increased. Otherwise, a blower for circulating the exhaust oxidizing gas and a cooling device for cooling the exhaust oxidizing gas at a high temperature do not need to be provided, thereby reducing the manufacturing cost.

Third Embodiment

Figure 10:
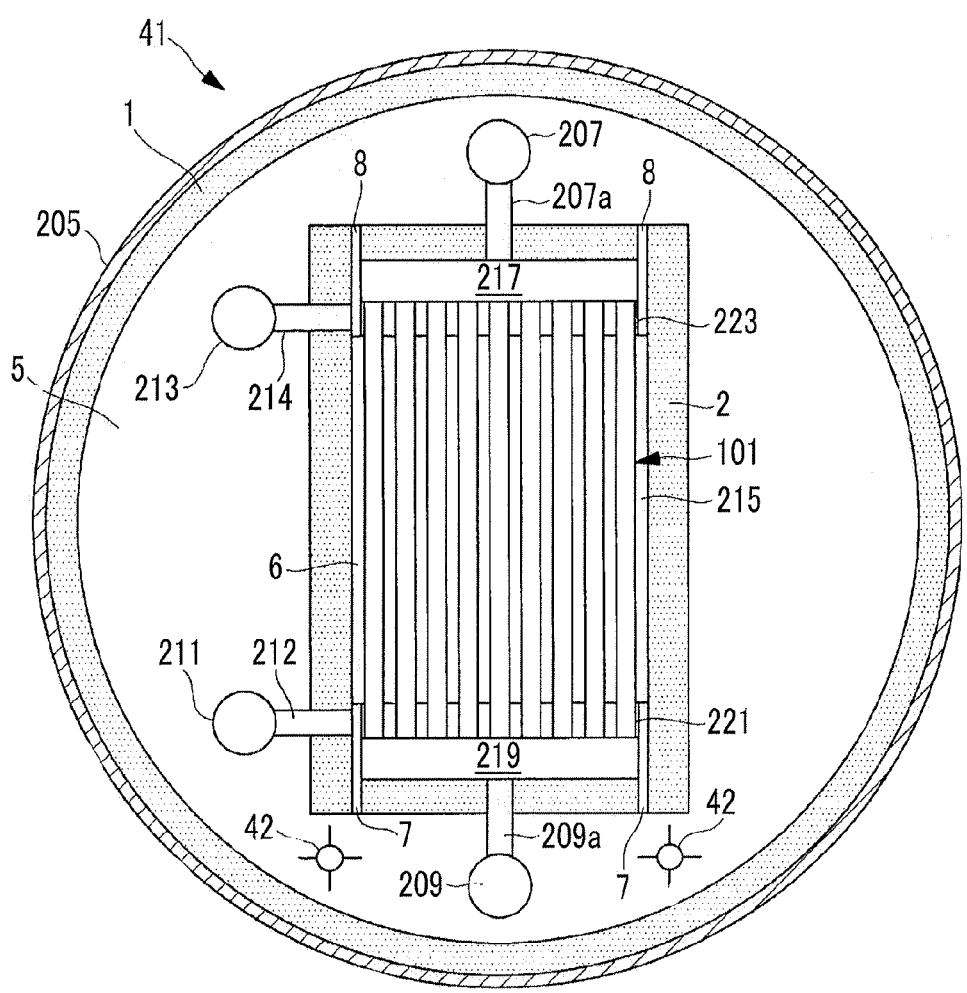
FIG. 10 is a transverse sectional view illustrating a convection flow rate adjusting device in a third embodiment.

As illustrated in FIG. 10, in a fuel cell module 41 of a third embodiment, the two lower dampers 11-1 and 11-2 and the two upper dampers 12-1 and 12-2 in the first embodiment described above are omitted, and a plurality of fans 42 are provided. The plurality of fans 42 forcibly generate convection which is a flow of the oxidizing gas that rises in the inner space 6 and moves downward in the outer space 5 by allowing the oxidizing gas to flow into the inner space from the outer space 5 via the plurality of lower flow passages 7.

Furthermore, when an arbitrary cell stack among the plurality of cell stacks 101 is at a higher temperature than the predetermined temperature range, the plurality of fans 42 increase the flow rate of the oxidizing gas that passes through the lower flow passage in the vicinity of the cell stack at the high temperature among the plurality of lower flow passages 7 so as to increase the flow rate of the oxidizing gas that flows through the vicinity of the cell stack at the high temperature in the power generation chamber 215. Therefore, regarding the cell stack at the high temperature, the cell stack at a higher temperature than the predetermined temperature range is cooled by the oxidizing gas cooled in the outer space 5 with high efficiency, and thus temperature of the cell stack can return to the predetermined temperature range. In the fuel cell module 41, the temperatures of all the cell stacks are within the predetermined temperature range or lower and are equalized. Therefore, power generation performance is enhanced.

When an arbitrary cell stack among the plurality of cell stacks 101 is at a lower temperature than the predetermined temperature range, the plurality of fans 42 reduce the flow rate of the oxidizing gas that passes through the lower flow passage in the vicinity of the cell stack at the low temperature among the plurality of lower flow passages 7 so as to reduce the flow rate of the oxidizing gas that flows through the vicinity of the cell stack at the low temperature in the inner space 6. Therefore, the cell stack at the low temperature is prevented from being excessively cooled by the oxidizing gas cooled in the outer space 5, and the temperature of the cell stack can return to the predetermined temperature range. In the fuel cell module 41, the temperatures of all the cell stacks are within the predetermined temperature range or lower and are equalized. Therefore, power generation performance is enhanced.

That is, the fuel cell module 41 of the third embodiment forcibly adjusts the flow rate of the oxidizing gas that rises in the inner space 6 and moves downward in the outer space 5 using the plurality of fans 42, and thus can reliably control the temperatures of the plurality of cell stacks 101 as in the fuel cell modules of the embodiments described above. As a result, in the fuel cell module 41 of the third embodiment, the temperatures of all the cell stacks of the fuel cell module are within the predetermined temperature range or lower and are equalized. Therefore, power generation performance is enhanced, and thus the plurality of cell stacks 101 can appropriately generate power.

The fuel cell module 41 can circulate the oxidizing gas between the inner space 6 and the outer space 5 at a greater flow rate than that of natural convection circulated between the inner space 6 and the outer space 5 by the heat generated by the plurality of cell stacks 101, by forcibly adjusting the flow rate of the oxidizing gas that rises in the inner space 6 and moves downward in the outer space 5, using the plurality of fans 42. Therefore, the fuel cell module 41 can return the temperature of the cell stack to the predetermined temperature range by performing cooling at higher efficiency compared to the fuel cell modules 201 and 31 in the first and second embodiments described above.

When the fuel cell module 41 in the third embodiment is combined with a GTCC or an MGT, the fuel cell module 41 can appropriately control the temperatures of the plurality of cell stacks 101. Therefore, as in the fuel cell module 201 in the first embodiment described above, the number of fuel cell modules per gas turbine can be increased. Otherwise, a blower for circulating the exhaust oxidizing gas and a cooling device for cooling the exhaust oxidizing gas at a high temperature do not need to be provided, thereby reducing the manufacturing cost.

Fourth Embodiment

Figure 11:
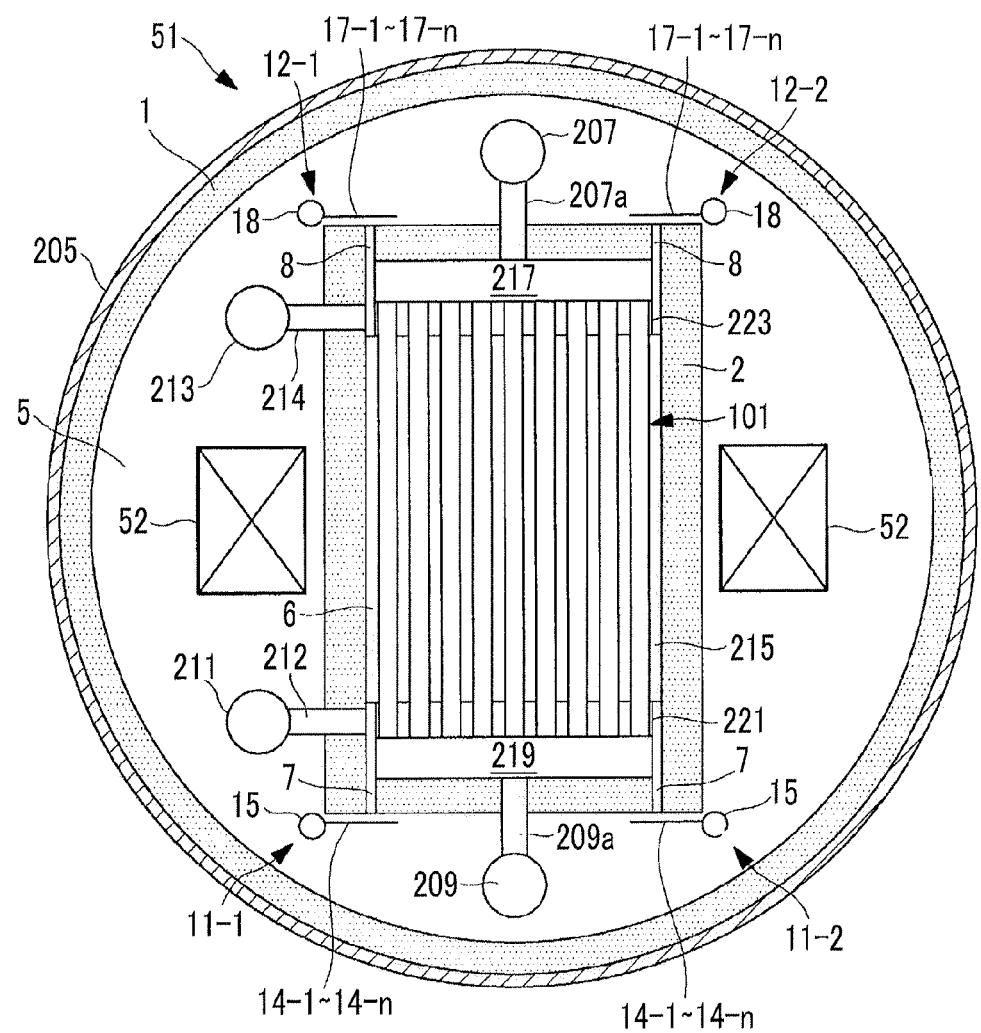
FIG. 11 is a transverse sectional view illustrating a convection flow rate adjusting device in a fourth embodiment.

As illustrated in FIG. 11, as a fuel cell module 51 of a fourth embodiment, the fuel cell module 201 in the first embodiment described above further includes a plurality of heat exchangers 52. The plurality of heat exchangers 52 are disposed in the outer space 5 to cool the oxidizing gas that flows in the outer space 5 through heat exchange between a refrigerant supplied from the outside of the fuel cell module 205 and the oxidizing gas that flows in the outer space 5. As the refrigerant that passes through the heat exchangers, water, steam, or the like is considered, and heat obtained through heat exchange can be effectively used.

In the fuel cell module 51 of the fourth embodiment, the oxidizing gas that flows in the outer space 5 is further cooled by the plurality of heat exchangers 52, and thus the oxidizing gas that flows in the outer space 5 can be cooled to a further lower temperature, compared to the fuel cell modules of the first to third embodiments in which the oxidizing gas that flows in the outer space 5 is cooled only by heat exchange with the outside air via the pressure vessel 205. Therefore, the plurality of cell stacks 101 can be cooled with high efficiency by using the oxidizing gas at a low temperature. In case where the heat exchanger is an evaporator, since the temperature of the refrigerant in the evaporator becomes the boiling point of an operating pressure, the temperature equalization of the internal space temperature can be achieved by achieving the temperature equalization of the oxidizing gas that flows in the outer space 5.

A combined power generation system to which the fuel cell module 51 of the fourth embodiment is applied can cool the plurality of cell stacks 101 with high efficiency. Therefore, as in the fuel cell modules of the embodiments described above, the number of fuel cell modules per gas turbine can be increased. Otherwise, the manufacturing cost can be reduced.

The plurality of heat exchangers 52 are disposed in the outer space 5 and are separated from the plurality of cell stacks 101 via the cell side insulation 2. Therefore, even when the plurality of heat exchangers 52 are broken, the refrigerant is prevented from coming into contact with the plurality of cell stacks 101, thereby preventing from the damage to the plurality of cell stacks 101. Accordingly, compared to fuel cell modules having other heat exchangers that are disposed in the inner space 6 to cool the plurality of cell stacks 101, the fuel cell module 51 prevents the damage to the plurality of cell stacks 101 and can appropriately control the temperatures of the plurality of cell stacks 101.

When the fuel cell module 51 in the fourth embodiment is further combined with a GTCC or an MGT, the fuel cell module 51 can cool the plurality of cell stacks 101. Therefore, as in the fuel cell module 201 in the first embodiment described above, the number of fuel cell modules per gas turbine can be increased. Otherwise, a blower for circulating the exhaust oxidizing gas and a cooling device for cooling the exhaust oxidizing gas at a high temperature do not need to be provided, thereby reducing the manufacturing cost.

The plurality of heat exchangers 52 can be replaced with another cooling device that cools the oxidizing gas in a method other than the heat exchange between the oxidizing gas that flows in the outer space 5 and the refrigerant. As the cooling device, a device which sprays water toward the outer space 5 to cool the oxidizing gas that flows in the outer space 5 using heat of vaporization of the water is exemplified. As in the fuel cell module 51 of the fourth embodiment described above, the fuel cell module provided with the cooling device can cool the plurality of cell stacks 101 with high efficiency. Therefore, in the applied combined power generation system, the number of fuel cell modules 41 per gas turbine can be increased. Otherwise, the manufacturing cost can be reduced.

The plurality of cell stacks 101 may be replaced with a plurality of cell stacks 101 which are different from the cylindrical and laterally striped SOFCs formed by the substrate tubes 103. A flat plate type cell stack is exemplified. Even in case where such a cell stack is applied to the fuel cell module, the temperatures of the plurality of cell stacks can be controlled by adjusting the flow rate of the oxidizing gas that flows between the outer space 5 and the inner space 6, and thus power can be appropriately generated.

DESCRIPTION OF REFERENCE NUMERALS AND SIGNS

1 pressure vessel internal insulation
2 cell side insulation 2 (using insulation board)
5 outer space
6 inner space
7 plurality of lower flow passages
8 plurality of upper flow passages
11-1 to 11-2 two lower dampers
12-1 to 12-2 two upper dampers
14-1 to 14-$n$ plurality of blades
17-1 to 17-$n$ plurality of blades
20 plurality of temperature measurement devices (temperature measurement means)
21 seal plate
22 thin film seal plate
24 cushion
31 fuel cell module
32 intermediate damper
33 plurality of intermediate flow passages
41 fuel cell module
42 plurality of fans
51 fuel cell module
52 plurality of heat exchangers (cooling device)
101 plurality of cell stacks
201 fuel cell module
205 pressure vessel
215 power generation chamber

The invention claimed is:

1. A fuel cell module comprising:
a pressure vessel which forms an internal space in which a gas is present;
an insulation board which partitions the internal space into an outer space and an inner space;
a plurality of cell stacks disposed in the inner space; and
a convection flow rate adjusting device,
wherein a lower flow passage which connects a lower portion of the outer space on a side vertically lower than the plurality of cell stacks to a lower portion of the inner space on a side vertically lower than the plurality of cell stacks, and an upper flow passage which connects an upper portion of the outer space on a side vertically higher than the plurality of cell stacks to an upper portion of the inner space on a side vertically higher than the plurality of cell stacks are formed in the insulation board,
wherein the convection flow rate adjusting device adjusts a flow rate of at least a part of the gas that flows toward the inner space from the outer space via the lower flow passage and flows toward the outer space from the inner space via the upper flow passage, and
wherein the convection flow rate adjusting device includes a lower damper that adjusts the flow rate of the gas that passes through the lower flow passage.

2. The fuel cell module according to claim 1, wherein the lower flow passage includes a plurality of lower flow passages which are respectively disposed at a plurality of different positions, and
the lower damper separately adjusts the flow rates of the gases which respectively pass through the plurality of lower flow passages.

3. The fuel cell module according to claim 1, wherein the lower damper includes a member which is elastically deformed to come into close contact with an opening of the lower flow passage on a side of the outer space in case where the lower flow passage is closed.

4. The fuel cell module according to claim 1, wherein the convection flow rate adjusting device further includes an upper damper which adjusts the flow rate of the gas that passes through the upper flow passage.

5. The fuel cell module according to claim 4, wherein the upper damper includes a member which is elastically deformed to come into close contact with an opening of the upper flow passage on the side of the outer space in case where the upper flow passage is closed.

6. The fuel cell module according to claim 4, wherein a blade of the upper damper which opens and closes the upper flow passage has higher heat resistance than a blade of the lower damper which opens and closes the lower flow passage.

7. The fuel cell module according to claim 6, wherein the upper damper includes an insulating member which covers the blade which opens and closes the upper flow passage.

8. The fuel cell module according to claim 1, wherein, when a temperature of the plurality of cell stacks becomes a higher temperature or a lower temperature than a predetermined temperature range, the convection flow rate adjusting device adjusts the flow rate of at least a part of the gas that flows toward the inner space from the outer space via the lower flow passage and flows toward the outer space from the inner space via the upper flow passage.

9. A combined power generation system comprising:
a fuel cell module including:
  a pressure vessel which forms an internal space in which a gas is present;
  an insulation board which partitions the internal space into an outer space and an inner space;
  a plurality of cell stacks disposed in the inner space; and
  a convection flow rate adjusting device,
  wherein a lower flow passage which connects a lower portion of the outer space on a side vertically lower than the plurality of cell stacks to a lower portion of the inner space on a side vertically lower than the plurality of cell stacks, and an upper flow passage which connects an upper portion of the outer space on a side vertically higher than the plurality of cell stacks to an upper portion of the inner space on a side vertically higher than the plurality of cell stacks are formed in the insulation board,
  wherein the convection flow rate adjusting device adjusts a flow rate of at least a part of the gas that flows toward the inner space from the outer space via the lower flow passage and flows toward the outer space from the inner space via the upper flow passage; and
a gas turbine which generates rotational power by using an exhaust fuel gas and an exhaust oxidizing gas discharged from the fuel cell module,
wherein an oxidizing gas compressed by using the rotational power is supplied to the fuel cell module as the gas, and
the plurality of cell stacks generate power using a fuel gas and the oxidizing gas.

* * * * *